(12) United States Patent
Evans et al.

(10) Patent No.: US 7,895,220 B2
(45) Date of Patent: Feb. 22, 2011

(54) MIDDLEWARE METHOD AND APPARATUS AND PROGRAM STORAGE DEVICE ADAPTED FOR LINKING DATA SOURCES TO SOFTWARE APPLICATIONS

(75) Inventors: Francine Evans, Houston, TX (US); Richard Meehan, Sugar Land, TX (US); Eric Klumpen, Vienna (AT); Ming Niu, Beijing (CN); Clinton Chapman, Missouri City, TX (US); Mathieu Will, Yokohama (JP)

(73) Assignee: Schlumberger Technology Corporation, Houston, TX (US)

( * ) Notice: Subject to any disclaimer, the term of this patent is extended or adjusted under 35 U.S.C. 154(b) by 1324 days.

(21) Appl. No.: 11/215,605

(22) Filed: Aug. 30, 2005

(65) Prior Publication Data

US 2007/0047279 A1    Mar. 1, 2007

(51) Int. Cl.
    *G06F 7/00* (2006.01)
(52) U.S. Cl. .................. 707/756; 707/602; 707/809
(58) Field of Classification Search .............. 707/6, 707/100, 101, 102, 103 R, 103 Y, 103 X, 707/103 Z, 104.1, 602, 756, 809
    See application file for complete search history.

(56) References Cited

U.S. PATENT DOCUMENTS

| 5,857,197 A * | 1/1999 | Mullins ............... 707/103 R |
| 7,340,484 B2 * | 3/2008 | S et al. ............................ 1/1 |
| 2005/0213722 A1 * | 9/2005 | Stormon et al. ........ 379/127.01 |

\* cited by examiner

*Primary Examiner*—Hosain T Alam
*Assistant Examiner*—Amy Ng
(74) *Attorney, Agent, or Firm*—John H. Bouchard; Mark Farrell

(57) ABSTRACT

Middleware services link multiple data sources to multiple software applications. In one implementation, the middleware receives data requests from different applications, each request including a set of data descriptions that specify which type of data is sought from multiple real-time data sources. The middleware adapts the requests from different types of applications, and the different data available from different real-time data sources, for compatibility with a single common user interface. A user can select which real-time data to map to the common user interface, while each application may request data through a different set of data descriptions. Adapters convert data formats and communication protocols of real-time data from multiple data sources for compatibility with a given requesting application. The adapters can be discovered dynamically without redeploying the middleware, enabling third-party developers to create and initiate the adapters to dynamically connect sources of real-time data to the applications via the middleware.

6 Claims, 15 Drawing Sheets

TIGHTLY COUPLED

LOOSELY COUPLED

MIDDLEWARE METHOD AND APPARATUS AND PROGRAM STORAGE DEVICE ADAPTED FOR LINKING DATA SOURCES TO SOFTWARE APPLICATIONS

BACKGROUND

The subject matter disclosed in this specification relates to a Middleware apparatus, and associated method and program storage device, adapted for interfacing between data sources and software applications and linking the data sources to the software applications, and, as a result, the software applications can each use a single user interface to obtain data from any one or more of the data sources without being concerned about the data formats and the communication protocols associated with the received data.

A software application, such as a drilling application, needs data when executing in a processor of a computer system. The software application may be able to easily obtain a first set of data from a first data source among a multitude of data sources and a 'first user interface' enables a user of the software application to obtain the first set of data from the first data source. However, the software application may need to be modified in order to obtain a second set of data from a second data source because the software application is not presently adapted to receive a data format and/or a communication protocol associated with the second set of data originating from the second data source. When the software application is modified to receive the data format and/or the communication protocol associated with the second set of data from the second data source, a 'second user interface' enables the user of the software application to obtain the second set of data from the second data source. However, the 'second user interface' is different from the 'first user interface' and, as a result, the user must learn to use the 'second user interface' in addition to the 'first user interface' in order to obtain the second set of data from the second data source.

Consequently, a middleware apparatus (and associated method and program storage device) is needed which interfaces between a multitude of data sources and one or more software applications, links the multitude of data sources to the software applications, and enables a user of a particular software application to use a 'single user interface' to obtain a multitude of data from the multitude of data sources, without modifying the particular software application in order to receive the multitude of data from the multitude of data sources, because the middleware apparatus (interposed between the multitude of data sources and the software applications) is adapted to convert the data formats and the communication protocols, associated with the multitude of data originating from the multitude of data sources, to a particular data format and a particular communication protocol which is acceptable to the particular software application before transmitting the multitude of data to the particular software application.

SUMMARY

One aspect of the present invention involves a program storage device readable by a machine tangibly embodying a program of instructions executable by the machine to perform method steps for linking one or more data sources to one or more applications, the method steps comprising: (a) receiving a data description pertaining to a set of requested data from one of the one or more applications; (b) passing the data description to the one or more data sources; (c) receiving a set of all available data from one of the one or more data sources; (d) generating a set of all available data pertaining to the data description in response to the receiving step (c), the set of all available data pertaining to the data description having a data format and a communication protocol; (e) changing at least one of the data format and the communication protocol to a second data format and a second communication protocol that is acceptable to the one of the one or more applications thereby generating modified data; and (f) passing the modified data back to the one of the one or more applications.

Another aspect of the present invention involves a method of linking one or more data sources to one or more applications, comprising the steps of: (a) receiving a data description pertaining to a set of requested data from one of the one or more applications; (b) passing the data description to the one or more data sources; (c) receiving a set of all available data from one of the one or more data sources; (d) generating a set of all available data pertaining to the data description in response to the receiving step (c), the set of all available data pertaining to the data description having a data format and a communication protocol; (e) changing at least one of the data format and the communication protocol to a second data format and a second communication protocol that is acceptable to the one of the one or more applications thereby generating modified data; and (f) passing the modified data back to the one of the one or more applications.

Another aspect of the present invention involves an apparatus adapted for linking one or more data sources to one or more applications, comprising: a middleware apparatus interconnected between the one or more data sources and the one or more applications adapted for: receiving a data description from one of the one or more applications, passing the data description to one or more data sources, receiving all available data from the data sources, generating in response thereto a set of all available data pertaining to the data description where the set of all available data pertaining to the data description has a data format and a communication protocol, changing at least one of the data format and the communication protocol to a resultant data format and a resultant communication protocol that is acceptable to the one of the one or more applications thereby generating modified data, and passing the modified data back to the one of the one or more applications.

Another aspect of the present invention involves a program storage device readable by a machine tangibly embodying a program of instructions executable by the machine to perform method steps for linking one or more data sources to one or more applications, the method steps comprising: receiving a data description pertaining to a set of requested data from an application and passing the data description to the one or more data sources; receiving from one of the one or more data sources a set of available data, the set of available data having a data format and a communication protocol; changing at least one of a data format and a communication protocol to a new data format and a new communication protocol thereby generating modified data; and passing the modified data back to the application.

Another aspect of the present invention involves a method of linking one or more data sources to one or more applications, comprising: receiving a data description pertaining to a set of requested data from an application and passing the data description to the one or more data sources; receiving from one of the one or more data sources a set of available data, the set of available data having a data format and a communication protocol; changing at least one of a data format and a communication protocol to a new data format and a new communication protocol thereby generating modified data; and passing the modified data back to the application.

Another aspect of the present invention involves an apparatus adapted for linking one or more data sources to one or more applications, comprising: middleware apparatus adapted for receiving a data description pertaining to a set of requested data from one of the one or more applications and passing the data description to the one or more data sources, the middleware apparatus receiving from one of the one or more data sources a set of available data, the set of available data having a data format and a communication protocol, the middleware apparatus changing at least one of a data format and a communication protocol to a new data format and a new communication protocol thereby generating modified data, the middleware apparatus passing the modified data back to the one of the one or more applications.

Another aspect of the present invention involves a program storage device readable by a machine tangibly embodying a program of instructions executable by the machine to perform method steps for linking one or more data sources to one or more applications, the method steps comprising: receiving a data description from one of the one or more applications and passing the data description to the data sources; generating modified mapped available data in response to the passing step and storing the modified mapped available data in a hub; and selecting, from among the modified mapped available data stored in the hub, at least a subset of the modified mapped available data representing data that will be received by the one of the one or more applications thereby identifying further modified mapped available data, the further modified mapped available data being received by the one of the one or more applications.

Another aspect of the present invention involves a program storage device readable by a machine tangibly embodying a program of instructions executable by the machine to perform method steps for linking one or more data sources to one or more applications, the method steps comprising: receiving at least one data description from an application; passing the data description to the data sources; receiving, from at least one of the data sources, a set of all available data; generating a set of available data pertaining to the data description in response to the set of all available data from the data sources; mapping the set of available data pertaining to the data description against the data description from the application thereby identifying a set of mapped available data; generating the set of mapped available data from at least one of the data sources, the set of mapped available data having a data format and a communication protocol; converting at least one of the data format and the communication protocol of the mapped available data to a new data format and a new communication protocol that is acceptable to the application thereby generating modified mapped available data; and passing the modified mapped available data back to the application.

Further scope of applicability will become apparent from the detailed description presented hereinafter. It should be understood, however, that the detailed description and the specific examples set forth below are given by way of illustration only, since various changes and modifications within the spirit and scope of the 'Middleware', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein.

DETAILED DESCRIPTION

Figure 1A:
FIGS. 1A and 1B illustrate a tightly coupled system and a loosely coupled system, FIG. 1B illustrating a bridge pattern applied to a source system to provide loose coupling between source and receiver systems.

There are many sources of real-time (RT) drilling data, yet there are no universal standards in regards to the format of the data, nor are there protocols for communicating with these sources of RT data. Software applications that wish to access multiple data sources must keep up with constant change and are prone to issues related to usability, security, deployment, and maintenance costs. In this specification, a software middleware solution is presented which addresses these issues, the aforementioned software middleware solution reducing the development and total cost of ownership (TCO) of both the software applications and the real-time data sources themselves. This software middleware solution focuses primarily on a data source comprised of real-time (RT) oilfield drilling data; however, the method and apparatus (and program storage device) employed in this specification can be applied to any other source of data.

Data from wireline and drilling tools can be provided by many sources to real-time drilling applications. These sources use a variety of protocols and data formats for providing data. In general, there are modifications to each of these sources and/or the protocol standard on a regular basis. For example, between the years 2000 and 2004, there were seven commercial releases of one widely used drilling acquisition system. In each release, modifications and extensions to the interfaces for communicating real-time data to and from the system were made to support new functionality or data. As a result, the real-time enabled applications using the acquisition system generally required an engineering effort to develop, test, and commercialize upgrades to existing applications so that they continued to function. In many cases, where applications were no longer supported, these applications just ceased to function. Many parallels can be drawn across other industries.

When dealing with electronic data exchange, there are ultimately two things which must be addressed in order to transmit the data from a source to a receiver: 'data format' and 'communication protocol'. Over the past several years, many petro-technical companies have developed a variety of conflicting proprietary 'data formats' and 'protocols' for electronic data exchange. This often created problems in data transfer between two corporate entities or business units with resulting loss of time and data. In order to remedy this problem, there have been several attempts at defining an industry wide standard for real-time drilling data.

The API Petroleum Information Data Exchange (PIDX) developed an industry standard Wellsite Information Transfer Specification (WITS) in order to facilitate information sharing and to provide data to remote monitoring facilities. WITS provides a standard binary format used to facilitate the transfer of well site data from one computer system to another as well as protocols for its movement. WITS is a complex standard and defines multiple files for the definition of the data being exchanged and allows for communication via serial, Ethernet or file transfer.

Drilling Automation Real-time (DART) uses a hierarchical structure to represent drilling data and is based around the idea of connecting to a data source through a CORBA connection. Data providers can then provide data to the DART CORBA server through Java language interfaces. In comparison to WITS, DART provides more flexibility and has a richer data structure. The objective of DART was to develop concepts for application integration and real-time data exchange to enhance multidisciplinary decision processing and to enable efficient quality assurance and verification of different field operations.

An XML format and a set of web services based upon SOAP is utilized for the exchange of drilling data (not just real-time data). This XML based system came to be known as Wellsite Information Transfer Standard Markup Language (WITSML). This standard is quickly becoming the de-facto standard for the transfer of drilling data. Since its inception however, four commercial versions of the standard have been released. In each release, smaller service pack releases have also occurred. Additionally, the implementation of the standard, particularly the web services, varies broadly between vendors. For example, vendors choose not to implement part of the API due to performance issues caused by access to dense time data by multiple clients. Because of these issues, using 'real-time time data' effectively requires advanced knowledge of the implementation.

Despite these various attempts at standardization, petro-technical companies currently still do not adhere to a common standard. Although the situation is getting better with the advent of WITSML, some companies prefer to stick with proprietary formats; others prefer to continue use of the older formats since the cost of revamping the older solutions is too costly; and still others are moving to other developing industry standards. Most of the time, companies use a mixture of formats, since one format usually does not include every source or type of data that is needed. Additionally, in order to use the software standards described above, each petro-technical company needs to develop or purchase software that delivers these standards to the user and/or other software systems. These software packages need to be updated regularly when changes to new version standards are developed.

The choice of selecting a real-time data source, that is to be supported by real-time applications, is usually driven by an immediate business need. This generally leads to an application which is highly focused on a particular set of real-time data from a specific real-time source. Architecturally, this is a bad design since it tightly couples the two systems together. This leads to problems both on the source and receiver sides. For the real-time source systems, such as a drilling acquisition system, each time a new application development group needs data, that group is added as a stakeholder and the level of risk increases due to changes in the source system. In general, this slows overall development speed and increases the total cost of ownership of the source system, the receiving system, and all other receiving systems which were previous stakeholders of the source system. Additionally, the ability of a real-time receiver to switch between sources is difficult due to the aforementioned 'tight coupling of the source and receiving systems'. At worst, a switch to another source can completely destroy a product because the underlying architecture cannot support such a modification.

Figure 1B:
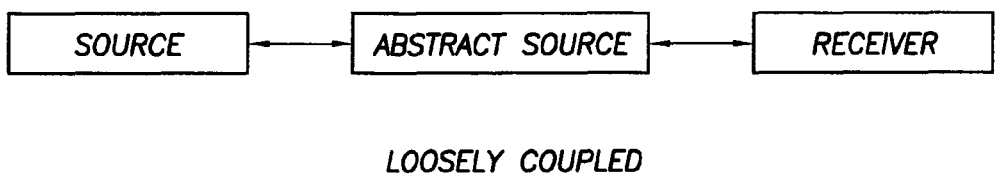

Refer now to FIGS. 1A and 1B. In FIG. 1A, the aforementioned 'tight coupling' of the source and receiving systems is illustrated. However, in FIG. 1B, a 'loosely coupled' system is illustrated wherein a reduction of the 'tight coupling' of FIG. 1A is generated by interconnecting an 'Abstract Source' (also known as an 'abstraction') between the receiver and source systems of FIG. 1A, the 'abstraction' of FIG. 1B employing a Bridge pattern. In the loosely coupled system of FIG. 1B, the Source system becomes just an implementation of the Abstract Source.

Figure 2:
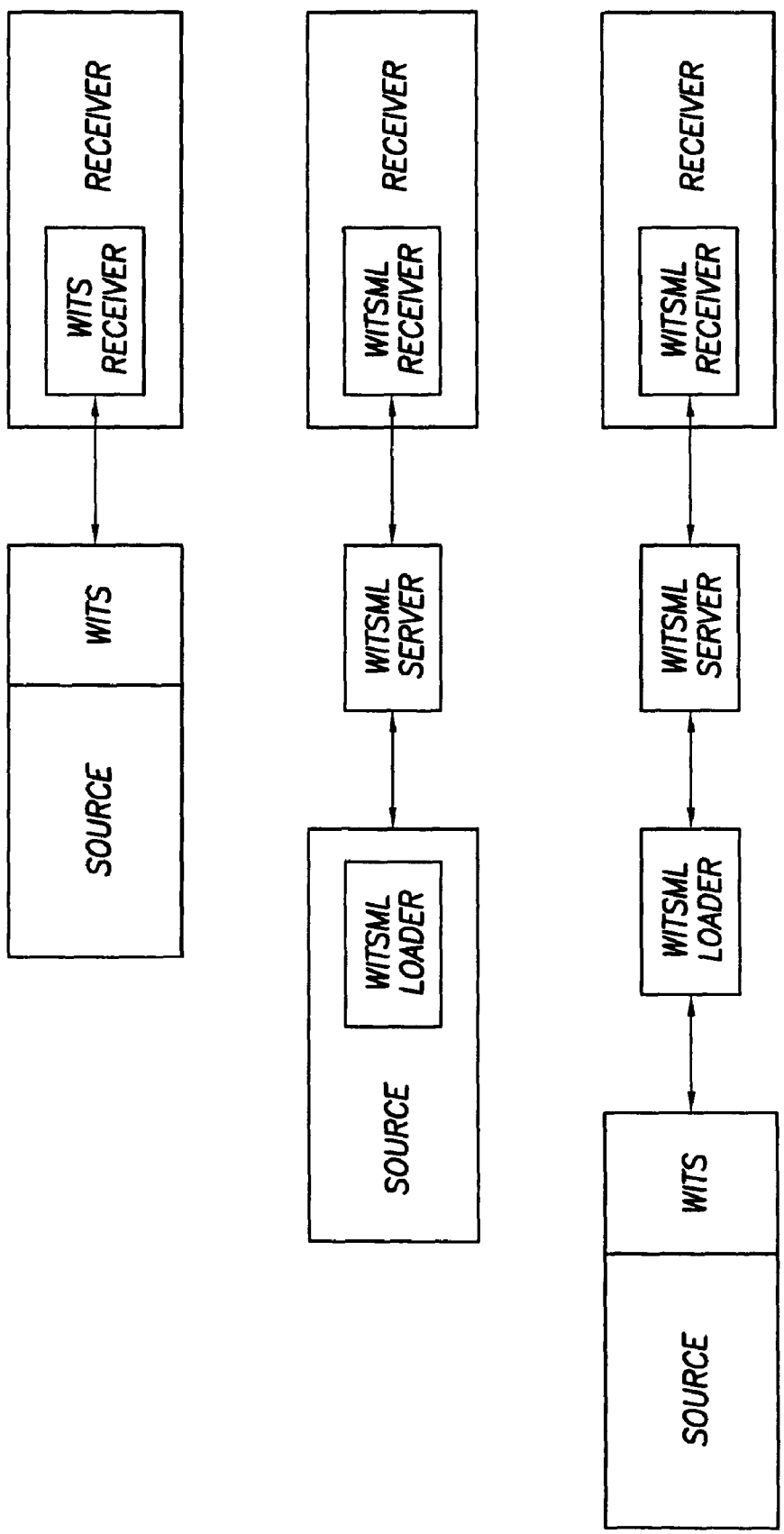
FIG. 2 illustrates two examples wherein the creation of standards were an attempt to move towards the loosely coupled system illustrated in FIG. 1.

Referring to FIG. 2, real-time source groups deal with applications wishing to access their data on an individual basis. Many times, this led to applications developed directly upon the real-time system creating very large, heavy systems. A great amount of time was spent in support and training of groups to add functionality to these types of systems and ultimately led to systems with huge instability, maintenance, and support problems. Additionally, each real-time source is complex and thus the sources themselves had to deal with usability issues in dealing with each application group. As mentioned previously, the creation of standards were an attempt to move towards the 'loosely coupled system' illustrated in FIG. 1B. For example, the Well Information Transfer Standard (WITS) provides an abstraction of the real-time source and helps to provide a more loosely coupled system. The 'WITSML' systems are attempting to provide abstraction through the addition of a 'server system' that is providing 'real-time data' to the 'Receiver system' from the 'Source system'. FIG. 2 illustrates an example of the use of the WITS and WITSML systems as abstract sources.

Another issue which arises during the development of the real-time applications is 'testing'. When an application uses real-time data, development and testing are usually difficult and is done by connecting to what is most convenient to the development/testing team. This has usually meant the addition of a 'production class source system' accessible by the receiver application development and testing groups. This additional infrastructure can be very costly. Additionally, development is sometimes performed against a "standard" implementation of a specific protocol. This again leads to great difficulty as issues are encountered during beta testing that find problems with the interpretation of the "standard" by commercial sources. Since 'actual real-time data' is not tested until field test, significant costs can be encountered when architectural issues need to be fixed.

For the end user, the connection to a real-time source has always been difficult due to the multitude of data sources and products used to connect to each individual source. In many cases, users choose not to connect to a source due to the complexity in connection with learning a new User Interface (UI) for establishing the connection. A reliable, consistent, and usable User Interface (UI) for establishing the connection is usually problematic to create because the access to the source comes so late in the development cycle. Consequently, there are at least two users of the 'real time application': the developer enabling the real-time application, and the end-user of the application.

As described above, developing an application to access real-time data is complex. To summarize, this complexity arises from the following: (1) Lack of knowledge related to the paradigm (tools, protocols, languages, security, and data schemas) for accessing data on the real-time source system, (2) Lack of documentation on the real-time source paradigm, (3) Inability to address architectural issues when changing to other real-time sources, (4) Inability to maintain the product due to changes in the real-time source, and (5) Inability to access real-time data during development. Ultimately, this increases the time and investment required to develop a real-time solution and relates directly to the overall cost of development and maintenance of a real-time enabled product.

In order to reduce the aforementioned development cost and development time, a 'middleware method and apparatus' (and associated program storage devices) will be discussed below with reference to FIGS. 3 through 21 of the drawings.

Refer now to FIGS. 3 through 21 of the drawings which will be discussed individually below.

One problem is that current real-time applications are 'tightly coupled' to the real-time sources they access (see FIG. 1A). As a result, the real-time application either ceases to function, or the real-time application will require significant development when there are changes to the source, or when a new source is added.

FIGS. 4 through 21 illustrate a 'Middleware method and apparatus' disclosed in this specification. In the 'Middleware method and apparatus' illustrated in FIGS. 4 through 21 (hereinafter also known as the 'DataLink Middleware'), the aforementioned 'tightly coupled' problem of FIG. 1A has been solved by interconnecting the 'DataLink Middleware' between the 'source of data' and the 'receiving application' which receives the data. When the 'DataLink Middleware' is interconnected between the 'source of data' and the 'receiving application', each real-time 'source of data' will interact only the 'DataLink Middleware'. Each 'source of data' has its own 'adapter' that plugs into the 'DataLink Middleware'. The 'DataLink Middleware', therefore, creates a single point of connection for the 'receiving applications' so that the 'receiving applications' can access the static and real-time drilling data originating from the multiple 'sources of data'. This will encapsulate the complexity of the connection to the data sources and provide a common development team close to the data sources that can maintain and create the appropriate 'adapters'. The beauty of this approach is that it is extremely flexible: 'adapters' are discovered dynamically without requiring redeployment of the software so that therefore anyone can create a new adapter. The 'DataLink Middleware' itself provides a 'User Interface' to allow the 'applications' to connect to the 'real-time data sources'. This 'User Interface' (see FIGS. 7A-7B) will provide for a method of "remembering" previous connection states thereby allowing users to customize the connection of required data items to source data items. The real-time 'applications' cannot modify the 'User Interface' and therefore this provides a common look and feel (i.e., a common User Interface) among all applications. Users that then use different applications will immediately know how to load real-time data from the 'sources' into the 'applications' if they have previously loaded real-time data (from the 'sources') into 'other applications' that are 'DataLink Middleware' enabled.

One issue when developing the 'User Interface' includes how to reconcile the different types of data that are available from the source versus what is needed by each individual real-time application. The 'data that is needed by the real-time applications' is a subset of the 'available data at the source'. Naturally, each application has a different subset, and each source contains a different list of available data. With this in mind, the 'DataLink Middleware' is designed such that, through the 'Application Programmers Interface (API)', the real-time applications only need to describe the data they need. The 'adapters' provide 'available data pertaining to the data descriptions', and then the user "maps" the following two items together in the 'User Interface': the aforementioned 'available data pertaining to the data descriptions' (which are available from the data sources and are generated by the 'adapters') with the aforementioned 'data descriptions' from the applications representing 'data that is needed by the real-time applications'. This mapping can be saved and can be loaded from file allowing development to do mapping to known sources. Additionally, as an aid, the 'DataLink Middleware' will provide a playback source simulator and recorder for application developer testing, end user training, and testing purposes.

The 'DataLink Middleware' of FIGS. 4-21 is deployed as a run-time kit for deployment with 'DataLink Middleware' enabled applications. Upon installation, the 'DataLink Middleware' connects to a website or ftp site that has the full set of available adapters. These adapters must be selected and downloaded individually or in a group to enable a connection to a source. As mentioned above, the 'DataLink Middleware' itself provides the 'common User Interface' for a connection to the 'DataLink Middleware' website. New 'DataLink Middleware' adapters are deployed as kits that can be installed after deployment of the 'DataLink Middleware' enabled applications. Additionally, the 'DataLink Middleware' can search and register itself on startup with the DataLink web server to check for available updates and patches. It has the ability to add more assemblies, which get discovered dynamically at run-time using reflection. In the case where web updates are not feasible, updates and patches can be installed via other means. Also, the 'DataLink Middleware' has a sophisticated mechanism to update itself, by downloading a newer version using FTP or a UNC share and deploying the same.

Figure 3:
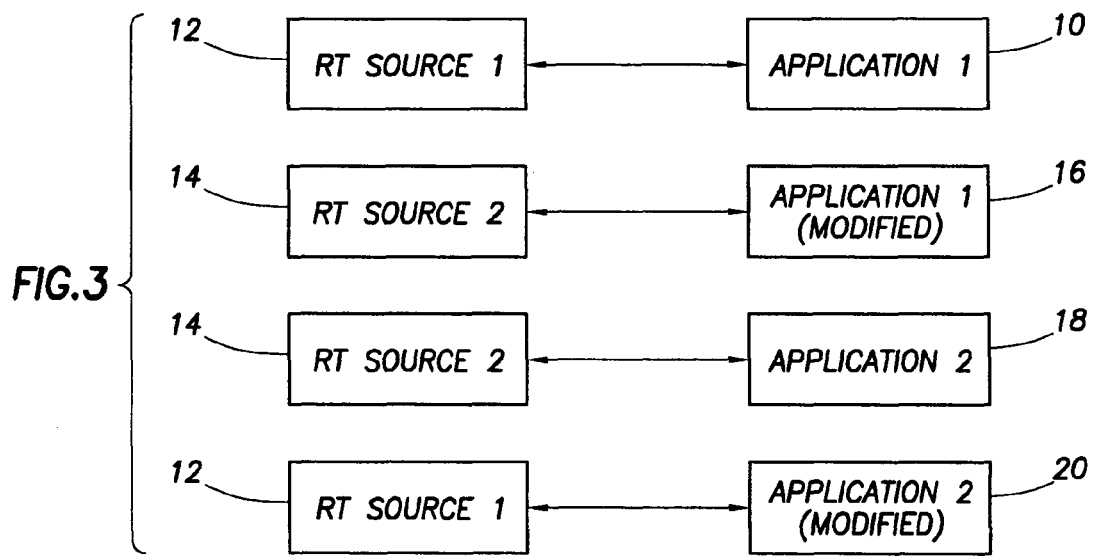
FIG. 3 illustrates how a software application can easily access a first set of data from a first data source but it is often necessary to modify the software application when that application needs to access a second set of data from a second data source.

In FIG. 3, an 'Application 1' 10 is shown tightly coupled to a real time source 'RT Source 1' 12. The 'Application 1' 10 can now receive real time data from the real time source 'RT Source 1' 12. However, when the 'Application 1' 10 is connected and tightly coupled to the real time source 'RT Source 2' 14, that 'Application 1' 10 cannot receive real time data from 'RT Source 2' 14 because the data formats and communication protocols associated with the available data from the 'RT Source 2' 14 will not allow for such data transfer. Therefore, the 'Application 1' 10 must be modified in order to allow for real time data to be transmitted from 'RT Source 2' 14 to the modified 'Application 1', which is shown in FIG. 3 as 'Application 1 (modified)' 16. Similarly, in FIG. 3, an 'Application 2' 18 is shown tightly coupled to a real time source 'RT Source 2' 14. The 'Application 2' 18 can now receive real time data from the real time source 'RT Source 2' 14. However, when the 'Application 2' 18 is connected and tightly coupled to the real time source 'RT Source 1' 12, that 'Application 2' 18 cannot receive real time data from 'RT Source 1' 12 because the data formats and communication protocols associated with the data originating from 'RT Source 1' 12 will not allow for such data transfer. Therefore, the 'Application 2' 18 must be modified in order to allow for real time data to be transmitted from 'RT Source 1' 12 to the modified 'Application 2', which is shown in FIG. 3 as 'Application 2 (modified)' 20. In addition, the 'User Interface' between 'application 10' and source 12' may be different from the 'User Interface' between 'application 16' and 'source 14', between 'application 18' and 'source 14', and between 'application 20' and 'source 12' as shown in FIG. 3.

Figure 4:
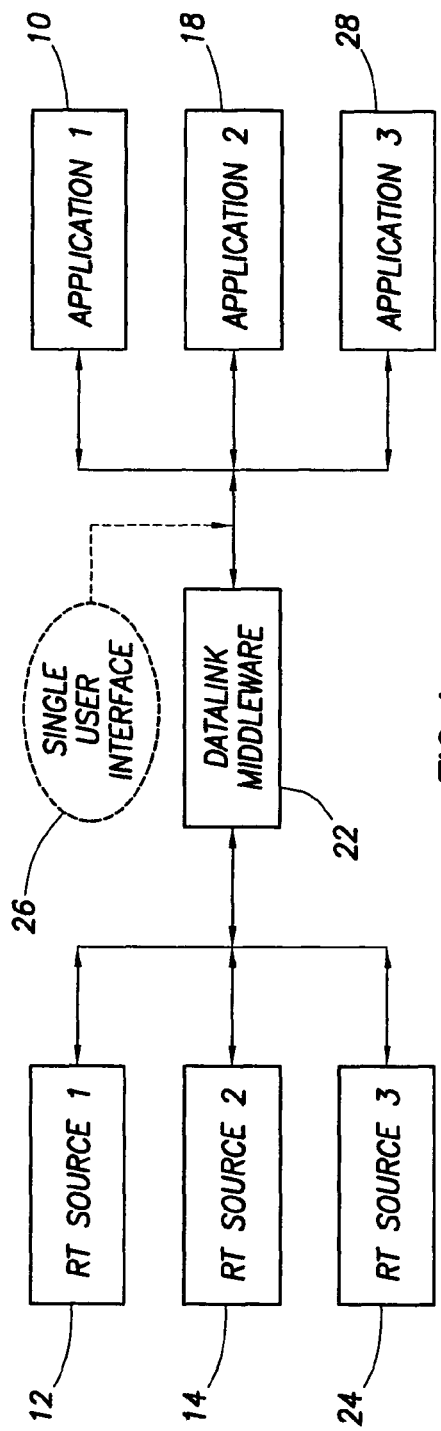
FIG. 4 illustrates a DataLink Middleware apparatus (and associated method and program storage device) interposed between a plurality of data sources and a plurality of software applications adapted to pass data from any of the data sources to any of the software applications thereby allowing each of the software applications to obtain their data from any of the data sources without requiring any modification to any of the software applications to obtain such data, each software application using a 'single user interface' to obtain their data from any of the data sources without regard to the data sources themselves.

In FIG. 4, in order to allow the real time data from data sources 12 and 14 of FIG. 3 to be transmitted to applications 10, 16, 18, and 20 of FIG. 3 without requiring any modification of such applications 10, 16, 18, and 20 and while using a 'common User Interface', in FIG. 4, a 'Data Middleware' 22 is functionally and operationally interconnected between the sources of 'real time data' (i.e., between the 'RT Source 1' 12 and the 'RT Source 2' 14 and the 'RT Source 3' 24 in FIG. 4) and the 'applications' which must receive and utilize that 'real time data' (e.g., the 'application 1' 10, the 'application 2' 18, and the 'application 3' 28 in FIG. 4). In FIG. 4, the 'applications' include 'Application 1' 10 and 'Application 2' 18 and 'Application 3' 28. When the 'application 1' 10 requests a 'first set of data' from the sources 12, 14, and 24, a 'data description' is sent from the 'application 1' 10 to the 'data sources' 12, 14, 24; the 'data sources' respond by transmitting 'all available data' back to the Middleware 22; however, the 'adapters' of the Middleware 22 will respond to the 'all available data' by transmitting a set of 'available data pertaining to the data descriptions'; and the user/operator will use the 'single User Interface' 26 to 'map' the 'data descriptions' from the 'applications' against the set of 'available data pertaining to the data descriptions' from the 'adapters' of the Middleware 22 thereby identifying 'mapped available data'. During the 'mapping', the user will select, from among the set of 'available data pertaining to the data descriptions', those items of 'data to be utilized by the applications' thereby identifying the 'mapped available data'. However, the 'mapped available data' has a data format and communication protocol which is not acceptable to the 'applications'. The 'data sources' 12, 14, 24 will generate the 'mapped available data' and the Middleware 22 will receive the 'mapped available data'; however, the 'adapters' of the Middleware 22 will convert or change the data format and communication protocol of the 'mapped available data' to a new data format and a new communication protocol which is acceptable to the 'applications' thereby creating 'modified mapped available data' which can now be utilized by the applications. Thus, when the 'application 2' 18 requests a 'second set of data' from the sources 12, 14, and 24, that 'single User Interface' 26 is also utilized by the user, and when the 'application 3' 28 requests a 'third set of data' from the sources 12, 14, and 24, that 'single User Interface' 26 is also utilized by the user. Therefore, a common and single User Interface 26 is utilized by the user in connection with any of the applications (such as 'application 1' 10 and 'application 2' 18 and 'application 3' 28) when data is requested by the 'applications' from the sources of data (such as from 'RT Source 1' 12 or 'RT Source 2' 14 or 'RT Source 3' 24). In addition, the 'applications' (i.e., 'application 1' 10 and 'application 2' 18 and 'application 3' 28) need not be modified when requesting data from the sources of data (i.e., 'RT Source 1' 12 or 'RT Source 2' 14 or 'RT Source 3' 24) because the 'adapters' of the 'DataLink Middleware' 22 will convert the data formats and the communication protocols of the 'mapped available data', which are being transmitted from the 'data sources', to a 'new data format and new communication protocol' which is acceptable to the 'applications' thereby generating 'modified mapped available data'. Then, when the 'modified mapped available data' having the 'new data format and new communication protocol' is generated from the 'adapters' of the Middleware 22, the 'applications' will actually receive the 'modified mapped available data' in the form of 'data objects' which are the same for all 'applications'.

Figure 5:
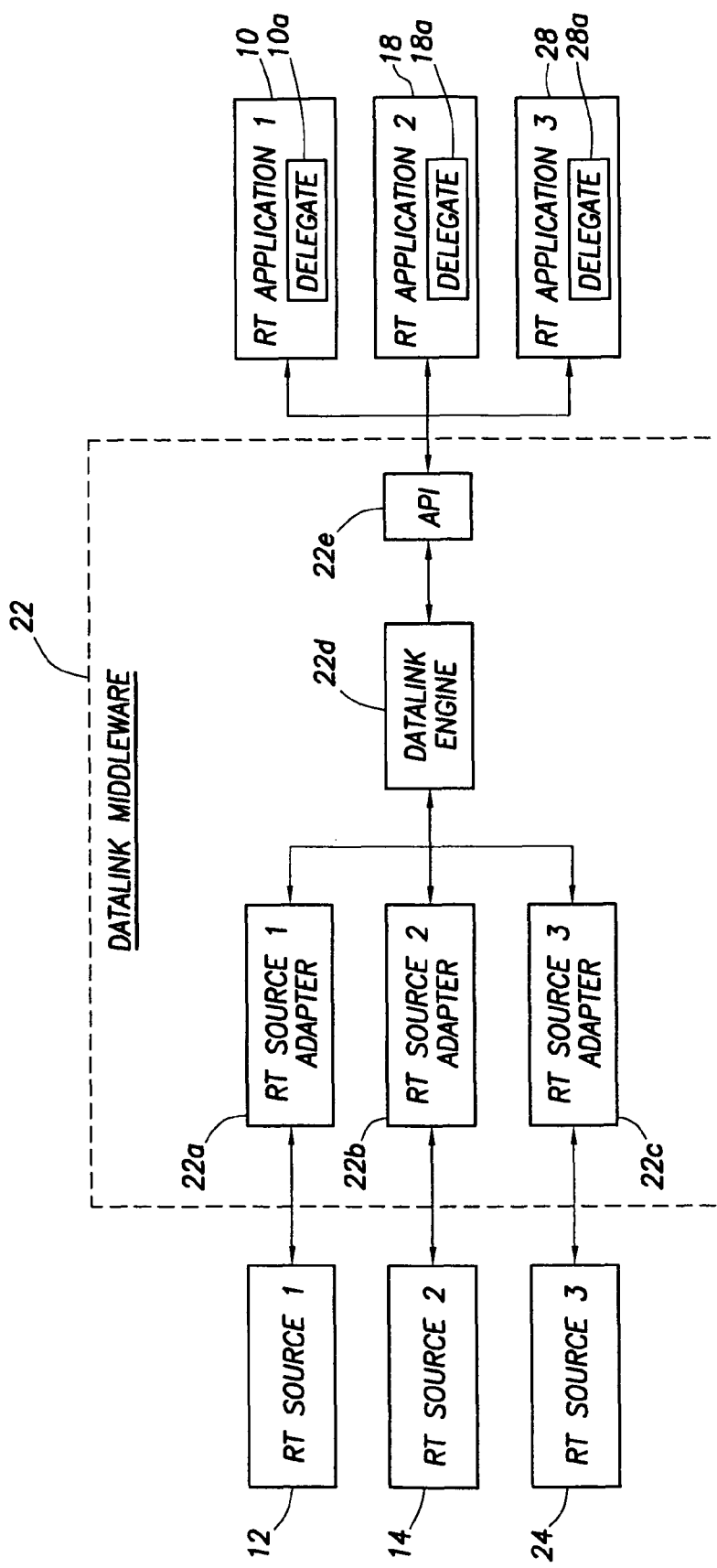
FIG. 5 illustrates a more detailed construction of the DataLink Middleware apparatus illustrated in FIG. 4.

In FIG. 5, a more detailed construction of the 'DataLink Middleware' 22 of FIG. 4 is illustrated. In FIG. 5, a plurality of sources of data (e.g., sources of 'real time' data) are operationally and/or functionally connected to one end of the DataLink Middleware 22 including the real time data source 'RT Source 1' 12, the real time data source 'RT Source 2' 14, and the real time data source 'RT Source 3' 24. A corresponding plurality of 'applications' are operationally and/or functionally connected the other end of the DataLink Middleware 22 including the 'real time (RT) application 1' 10, the 'real time (RT) application 2' 18, and a 'real time (RT) application 3' 28. Each of the applications include a 'delegate' adapted for receiving therein the data which is received from the 'data sources' 12, 14, 24. For example, 'RT Application 1' 10 includes a 'delegate' 10a, the 'RT Application 2' 18 includes a 'delegate' 18a, and the 'RT Application 3' 28 includes a 'delegate' 28a. In particular, when an 'application' 10 or 18 or 28 sends a 'data description' to the 'data sources' 12, 14, and 24 corresponding to a set of 'requested data', each 'data description' has its own 'delegate' set up in the 'application', such that different types of data being transmitted from the 'data sources' 12, 14, 24 can be received in different 'delegates' disposed within a single 'application'. For example, data transmitted from the 'data sources' corresponding to a received 'data description 1' would be received in a 'delegate 1' of an 'application', and data transmitted from the 'data sources' corresponding to a received 'data description 2' would be received in a 'delegate 2' of the 'application'. However, if the 'application' sends a 'particular notation', such as '*', along with a 'particular data description' to the 'data sources', all of the data transmitted from the 'data sources' to the 'application' corresponding to that 'particular data description' would be received in 'a single delegate' of the 'application.

Figure 7A:
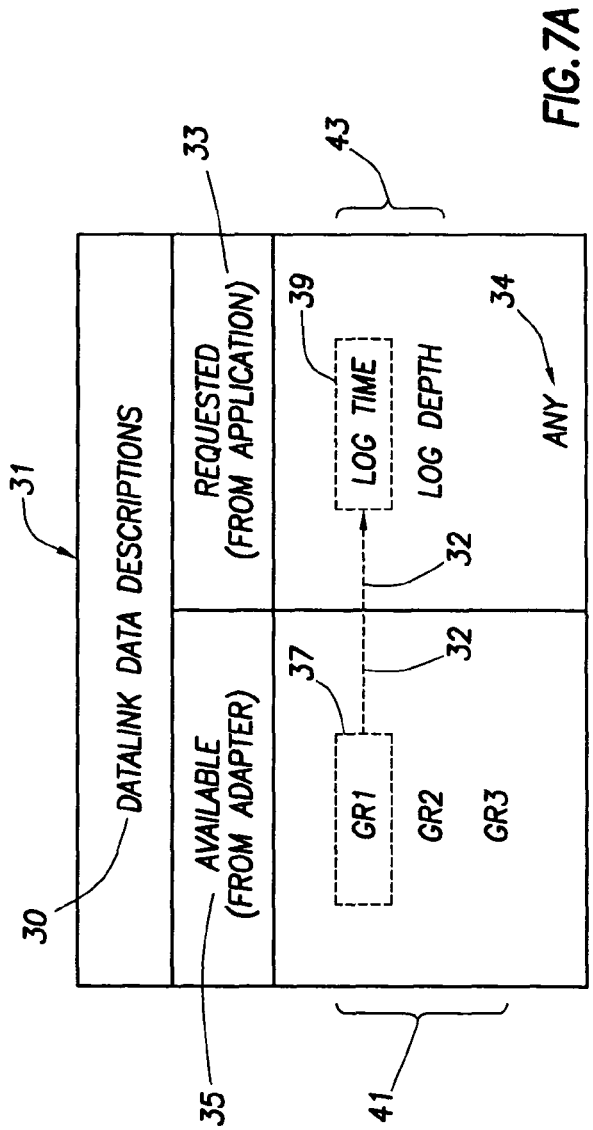
FIGS. 7A and 7B illustrate an example of the mapping of requested data, on the User's Interface, from a software application to the available data from a data source adapter.
Figure 7B:
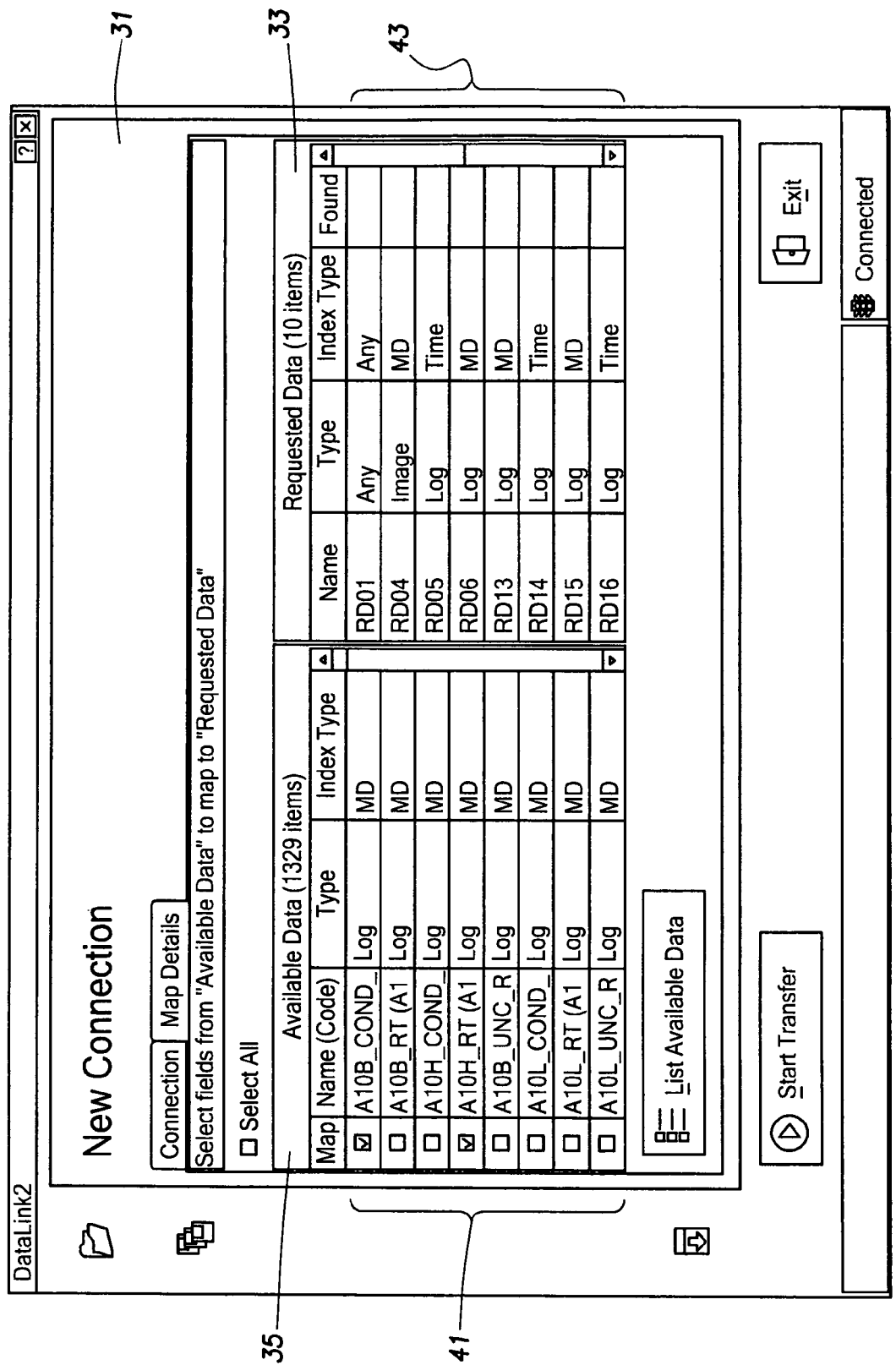

In FIG. 5, the DataLink Middleware 22 includes a plurality of 'adapters' 22a, 22b, and 22c corresponding, respectively, to the plurality of 'data sources' 12, 14, 24, there being one 'adapter' for each 'data source'; for example, real time (RT) Source 1 adapter 22a is functionally and/or operationally connected to the 'real time (RT) source 1' 12, real time (RT) Source 2 adapter 22b is functionally and/or operationally connected to the 'real time (RT) source 2' 14, and real time (RT) Source 3 adapter 22c is functionally and/or operationally connected to the 'real time (RT) source 3' 24. In FIG. 5, the DataLink Middleware 22 also includes a DataLink Engine 22d functionally and/or operationally connected to the 'adapters' 22a, 22b, and 22c, and an Application Programmer's Interface (API) 22e functionally and/or operationally connected to the DataLink Engine 22d. The 'applications' including 'RT Application 1' 10 and 'RT Application 2' 18 and 'RT Application 3' 28 are each functionally and operationally connected to the API 22e. In FIG. 5, the Application Programmer's Interface (API) 22e is responsible for setting up the 'Single User Interface' 26 of FIG. 4 (an example of which is shown in FIGS. 7A-7B) which is a 'common User Interface' used by each of the plurality of applications 10, 18, 28 for the purpose of allowing the user to 'map' the 'available data pertaining to the data descriptions' generated from the 'adapters' 22a-22c with the 'data descriptions' from the 'applications' 10, 18, 28, which will be discussed in more detail below. When the user 'maps' the 'available data pertaining to the data descriptions' with the 'data descriptions' thereby generating 'mapped available data' as referenced above, the 'data sources' 12, 14, 24 will generate the 'mapped available data', and the adapters 22a, 22b, and 22c will receive the 'mapped available data' from the data sources 12, 14, and 24 in FIG. 5. Note here that the 'mapped available data' has a data format and a communication protocol. At this point, the 'adapters' 22a-22c will convert or otherwise change the data formats and the communication protocols associated with the 'mapped available data' into data formats and communication protocols which are otherwise acceptable to the 'applications' 10 and 18 and 28 thereby generating a set of 'modified mapped available data'. The 'applications' will then receive the 'modified mapped available data', which are being transmitted from the 'adapters' 22a-22c, in the form of 'data objects' which are the same for all 'applications' 10, 18, 28.

In operation, the DataLink Engine 22d will pass a request for 'data' from the 'applications' 10, 18, and 28 (called a 'data description') to the data sources 12, 14, and 24 via the DataLink Engine 22d; and the 'data sources' 12, 14, 24 will, responsive to the 'data description', generate 'all available data' which is comprised of a set of all data that is available from the 'data sources'. The 'adapters' 22a-22c of the DataLink Middleware 22 will receive the 'all available data' from the 'data sources' and, responsive thereto, the 'adapters' 22a-22c of the Middleware 22 will generate a set of 'available data pertaining to the data descriptions'. At this point, using a 'User Interface' (an example of which is shown in FIGS. 7A-7B) that is being displayed on the user's computer display screen, the user/operator of the 'application' will 'map' the 'available data pertaining to the data description' (which are being generated from the 'adapters' 22a, 22b, 22c of the middleware 22) with the 'data descriptions' (originating from the 'applications') representing the data that is needed by the real-time applications. As a result of this 'mapping' by the user, a set of 'mapped available data' will be identified. The 'data sources' will receive the an indication representing the 'mapped available data' that was generated by the user during the 'mapping' function, and, responsive thereto, the 'data sources' 12, 14, 24 will then transmit the 'mapped available data' to the 'adapters' 22a, 22b, 22c of the Middleware 22. The 'adapters' 22a, 22b, 22c will convert the 'data format and communication protocol' of the 'mapped available data' into a 'new data format and new communication protocol' which is acceptable to the 'applications' 10, 18, 28, and, as a result, the 'adapters' 22a-22c will generate 'modified mapped available data'. The 'DataLink Engine' 22d will queue-up and pass the 'modified mapped available data' from the 'adapters' to the requesting applications 10, 18, and 28 in the form of 'data objects' where the 'data objects' are acceptable to all of the 'applications' and are the same for all 'data sources'. The above referenced 'mapping' function will be discussed in more detail later in this specification in connection with FIGS. 7A-7B.

Figure 6:
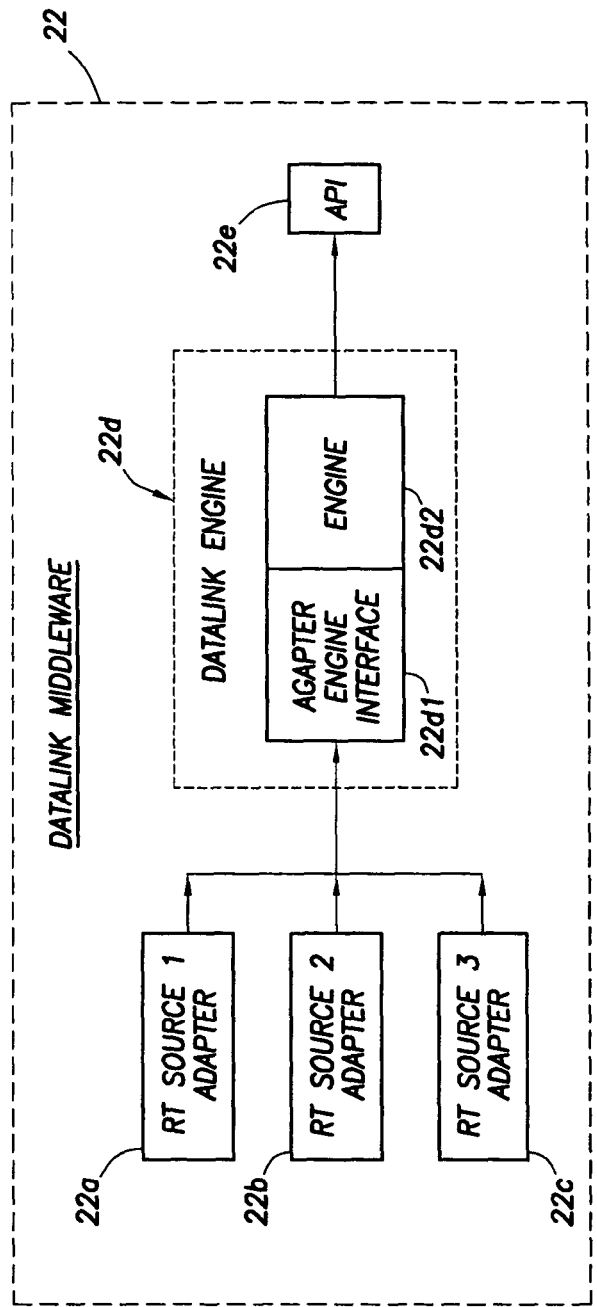
FIG. 6 illustrates a more detailed construction of the DataLink Engine apparatus illustrated in FIG. 5.

In FIG. 6, a more detailed construction of the DataLink engine 22d of FIG. 5 is illustrated. In FIG. 6, the DataLink engine 22d includes an 'adapter-engine interface' 22d1 and an engine 22d2. The 'adapter-engine interface' 22d1 is responsible for instructing each of the adapters 22a, 22b, and 22c how the adapters 22a-22c should be written in order to properly convert or otherwise change the data formats and the communication protocols associated with the 'mapped available data' (that is received from the data sources 12, 14, 24) into 'new data formats and new communication protocols' which are otherwise acceptable to the 'applications' 10 and 18 and 28. For example, the 'RT Source 1 adapter' 22a converts the data formats and communication protocols associated with the 'mapped available data' received from the real time data source 'RT Source 1' 12 into a data format and communication protocol which is acceptable to the requesting 'application' 10 or 18 or 28. The 'adapter-engine interface' 22d1 of the DataLink engine 22d will instruct the 'adapter' 22a how the code in the 'adapter' 22a should be written in order to properly change or convert the data formats and communication protocols associated with the 'mapped available data' which is received from the real time data source 'RT Source 1' 12 into a data format and a communication protocol which is acceptable to the requesting 'application' 10 or 18 or 28.

In FIGS. 7A-7B, referring initially to FIG. 7A, recall that the Application Programmer's Interface (API) 22e of FIG. 5 sets up the 'single user interface' 26 of FIG. 4, the 'single user interface' 26 being used by the user/operator associated with each of the 'applications' 10, 18, and 28 in order to perform the above referenced 'mapping' function. An example of the 'single user interface' 26 is shown in FIGS. 7A-7B. For example, in FIG. 7A, when the 'RT Application 1' 10 requests 'data' from the 'data sources' 12, 14, and 24 (hereinafter called 'requested data'), the 'application' will send a 'data description' associated with the 'requested data' to the 'data source' via the 'DataLink Middleware' 22. The 'data source' will send 'all available data' back to the 'DataLink Middleware' 22; however, the 'adapters' of the 'DataLink Middleware' 22 will re-send a set of 'available data pertaining to the data descriptions' back to the API 22e, the 'available data pertaining to the data descriptions' corresponding to the 'data description' associated with the 'requested data' originating from the 'application'. The API 22e will now set up the 'single user interface' 26 of FIG. 4, an example of which is shown in FIGS. 7A-7B. The user will utilize the 'single User Interface' 31 of FIGS. 7A-7B (being displayed on the user's computer display sceen) to 'map' the 'available data pertaining to the data descriptions' from the 'adapters' 22a-22c against the 'data description' from the 'application' representing the 'requested data'.

FIGS. 7A-7B illustrate one example of the 'single User Interface' 26 which is used to perform the aforementioned 'mapping' of the 'data description' (which represents the 'requested data' that is requested by the 'applications') with the 'available data pertaining to the data descriptions' (which is generated from the 'adapters' 22a-22c). In FIG. 7A, for example, a simple example of a 'User Interface' 31 includes the 'DataLink Data Descriptions' 30. The 'DataLink Data Descriptions' 30 are being displayed (by the API 22e) on a display screen of a workstation or other computer system for the benefit of the user/operator of the 'applications' 10, 18, and 28. The user/operator (when viewing the 'DataLink Data Descriptions' 30 associated with the 'User Interface' 31 of FIG. 7A being displayed on the display screen of the workstation or other computer system) must 'map' the 'data descriptions' 33 [see 'REQUESTED (from Application) 33], which represents the 'requested data' from the 'applications' 10, 18, 28, with the 'available data pertaining to the data descriptions' 35 [see 'AVAILABLE (from Adapter) 35] representing the available data pertaining to the data descriptions which is generated by the 'adapters' 22a-22c. The term 'map' or 'mapping' means that the user/operator will select, from among the set of 'available data corresponding to the data descriptions' (41 in FIG. 7A) generated from the 'adapters' associated with the Middleware 22, those 'items of data (37 of FIG. 7A) which directly corresponds to the 'data descriptions' (39 of FIG. 7A) representing the requested data', thereby identifying 'mapped available data'. In our simple example illustrated in FIG. 7A, the user/operator will perform the 'mapping' 32 where the 'available data pertaining to the description' (Gamma Ray 1 or GR1) 37 from the 'adapters' 22a-22c is mapped against the 'data description' (Log Time) 39 which was requested by the 'applications' 10 or 18 or 28. The aforementioned 'mapping' function, which is performed by the user/operator of the 'application', is indicated by element numeral 32 in FIG. 7A. However, if the user/operator wants to receive 'any and all' data which can be generated by a 'data source' 12, 14, and/or 24, the user/operator will click on the word 'ANY' as indicated by numeral 34 in FIG. 7A. In FIG. 7B, an example of an actual screenshot of the User Interface 31 shown in FIG. 7A is illustrated in FIG. 7B.

Figure 8:
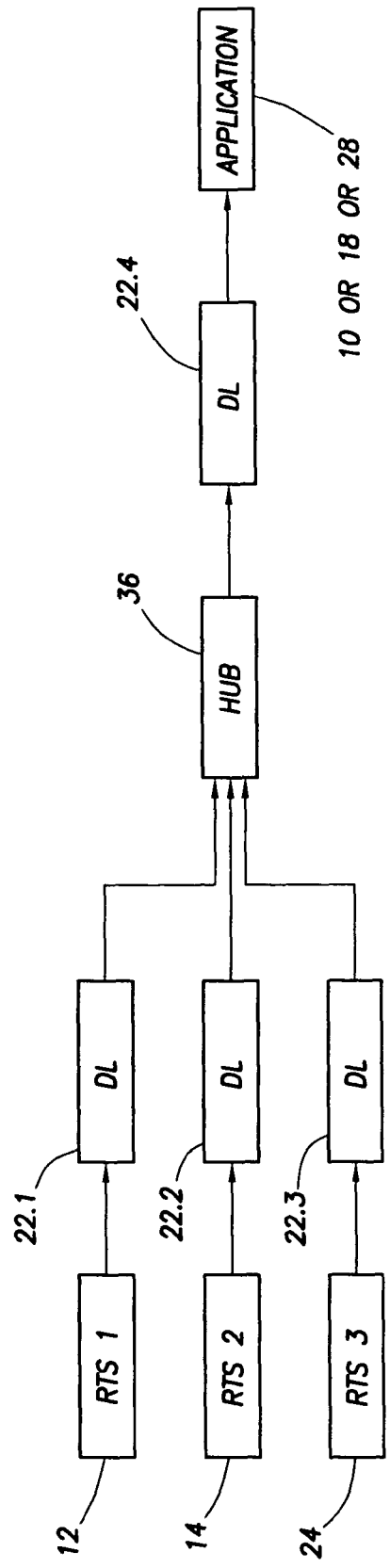
FIG. 8 illustrates a system comprised of a plurality of DataLink Middleware apparatus (DL) interposed, respectively, between a corresponding plurality of Real Time (RT) sources of data and a Hub, another DataLink Middleware apparatus (DL) being interposed between the Hub and a software application.

In FIG. 8, an example of the use of the 'HUB' 36 is illustrated. In FIG. 8, the plurality of sources of real time and other 'data' (hereinafter called 'data sources'), including the 'RT Source 1' 12 (or 'RTS 1' 12), the 'RT Source 2' 14 (or 'RTS 2' 14) and the 'RT Source 3' 24 (or 'RTS 3' 24) of FIG. 5, are shown being functionally and/or operationally connected, respectively, to a corresponding plurality of 'DataLink Middleware' apparatus 22 (DL 22) including DL 22.1, DL 22.2, and DL 22.3. Each of the plurality of 'DataLink Middleware' 22.1, 22.2, and 22.3 are connected to a single 'HUB' 36. The 'HUB' 36 is further operationally and/or functionally connected to a further 'DataLink Middleware' apparatus 22 including DL 22.4, that further 'DataLink Middleware' apparatus DL 22.4 being further operationally and functionally connected to an 'application' 10 or 18 or 28, which could be any one of the 'applications' 10, 18, and 28 in FIG. 5 including 'RT Application 1' 10 and 'RT Application 2' 18 and 'RT Application 3' 28 of FIG. 5.

In operation, referring to FIG. 8, the 'application' 10, 18, or 28 will request 'real time data' (hereinafter called 'requested data') from the data sources 'RTS 1' 12, 'RTS 2' 14, and 'RTS 3' 24 by sending one or more 'data descriptions' associated with the 'requested data' to the 'data sources'. The DL 22.4 will pass the 'data descriptions' to the HUB 36, and the DL 22.1, DL 22.2, and DL 22.3 will pass the 'data descriptions' from the HUB to the 'data sources' 12, 14, 24. In response thereto, the 'data sources' 12, 14, 24 will transmit 'all available data' back to the DataLink Middleware apparatus DL 22.1, DL 22.2, and DL 22.3; however, the 'adapters' 22a-22c associated with the Middleware DL 22.1, DL 22.2, and DL 22.3 will respond to the 'all available data' from the 'data sources' by generating a set of 'available data corresponding to the data descriptions'. The API 22e in each of the DL 22.1, DL 2.2, and DL 22.3 will set up and display the User Interface 31 of FIGS. 7A-7B on the user/operator's computer display screen (i.e., on the recorder or display device 44c of FIG. 11). Using the User Interface 31, the user/operator will now 'map' the following two items together which will thereby generate 'mapped available data': (1) the 'available data corresponding to the data descriptions' from the 'adapters' 22a-22c of the Middleware DL 22.1, DL 2.2, and DL 22.3 with (2) the 'data descriptions' representing the 'requested data' from the 'applications'. The term 'map' or 'mapping' means that the user/operator will select, from among the set of 'available data corresponding to the data descriptions' (41 in FIG. 7A) generated from the 'adapters' associated with the Middleware DL 22.1, DL 2.2, and DL 22.3, those 'items of data (37 of FIG. 7A) which directly corresponds to the 'data descriptions' (39 of FIG. 7A) representing the requested data', thereby identifying 'mapped available data'.

When this 'mapping' is complete, the 'data sources' 12, 14, 24 will now transmit the 'mapped available data' to the DL 22.1, DL 2.2, and DL 22.3, the 'mapped available data' corresponding to the aforementioned 'items of data which directly corresponds to the data descriptions representing the requested data' (37 of FIG. 7A). Note that the 'mapped available data' is usually a subset of the 'available data' from the 'data sources'. At this point, the DL 22.1 has received a first subset of 'mapped available data', the DL 22.2 has received a second subset of 'mapped available data', and the DL 22.3 has received a third subset of 'mapped available data'. The 'adapters' 22a-22c of the DL 22.1, the DL 2.2, and the DL 22.3 will now each 'convert' the data format and the communication protocol associated with the first subset of 'mapped available data' and the second subset of 'mapped available data' and the third subset of 'mapped available data' to a 'new data format and a new communication protocol' which is acceptable to the 'application' 10 or 18 or 28; and, as a result, when these 'conversions' are complete, the DL 22.1 will generate a 'first subset of modified mapped available data' and the DL 22.2 will generate a 'second subset of modified mapped available data' and the DL 22.3 will generate a 'third subset of modified mapped available data'. The aforementioned 'first and second and third subsets of modified mapped available data' will now be stored in the HUB 36. The API 22e of DL 22.4 will now set up the User Interface 31 of FIGS. 7A-7B so that the user/operator of the 'application' 10 or 18 or 28 can select, from among 'the first subset of modified mapped available data and the second subset of modified mapped available data and the third subset of modified mapped available data' which is stored in the HUB 36, that 'data which shall be immediately received by the application 10 or 18 or 28'. The 'adapters' 22a-22c of the DL 22.4 will now convert (where necessary) the data format and the communication protocols of the 'data which shall be immediately received by the application 10 or 18 or 28' to a data format and a communication protocol which is acceptable to the 'application' thereby generating 'further modified mapped available data'. The 'DataLink Engine' 22d of the DL 22.4 will now queue-up and pass the 'further modified mapped available data' to the 'delegates' of the 'application' 10 or 18 or 28. The 'application' 10 or 18 or 28 is now ready to execute its programs while using the 'further modified mapped available data'. The 'further modified mapped available data' is passed to the 'delegates' of the 'applications' in the form of 'data objects' which are the same for all 'applications'.

Figure 9:
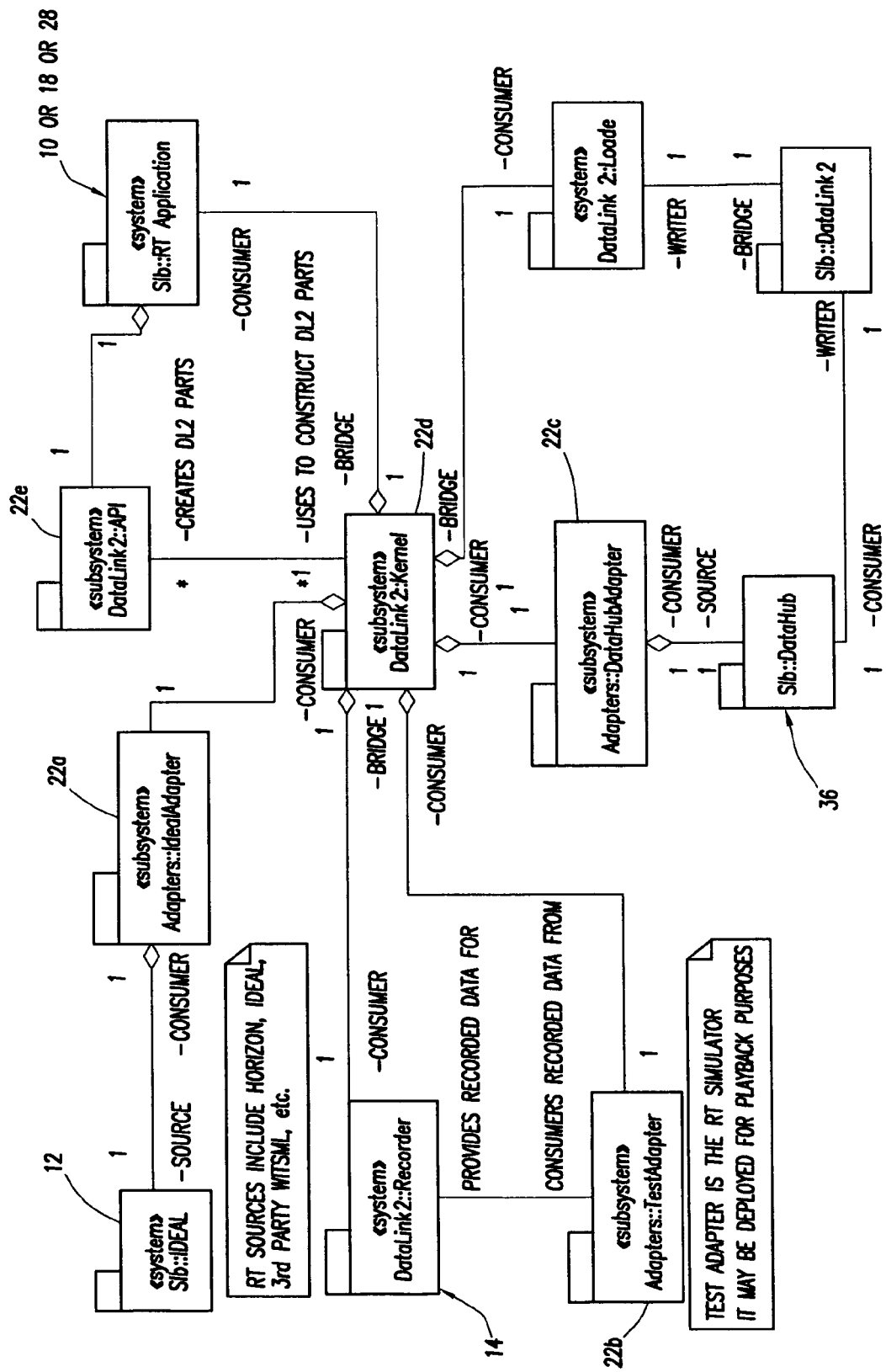
FIG. 9 illustrates another construction of the DataLink Middleware apparatus illustrated in FIG. 5, FIG. 9 illustrating the relationship between a Real Time (RT) application (top right) to various Real Time (RT) sources of data, such as 'SLB: DataHub', 'IDEAL', and a Test Adapter.

In FIG. 9, a more detailed construction of the 'system' of FIG. 5 is illustrated including the one or more of the 'sources of real time data' 12, 14, and/or 36, the 'real time applications' 10, 18, and/or 28, and the 'DataLink Middleware' apparatus 22 functionally and operationally interconnected between the 'sources of real time data' 12, 14, 36 and the 'real time applications' 10, 18, 28. In FIG. 9, the 'sources of real time data' include the IDEAL source 12, the Recorder 14, and the DataHUB (or HUB) 36. The DataLink Middleware apparatus 22 includes the 'adapters' further including the 'Ideal-Adapter' 22a for the 'IDEAL' real time data source, the 'TestAdapter' 22b for the 'DataLink Recorder' 14, and the 'DataHubAdapter' 22c for the HUB 36; the 'DataLink::Kernel' DataLink engine 22d; and the 'DataLink::API' Application Programmer's Interface (API) 22e. The 'Application' which requests the 'data' includes the 'Slb::RT Application' 10 or 18 or 28. In operation, the 'system' of FIG. 9 functions as stated above. The 'Application' 10 or 18 or 28 will 'request' certain 'data' by sending one or more 'data descriptions' to the 'data sources'. The 'data sources' will respond by transmitting 'all available data' back to the DataLink Middleware 22. The 'adapters' 22a-22c of the Middleware 22 will respond to the set of 'all available data' by generating 'available data pertaining to the data descriptions'. The API 22e will set up the User Interface 31 of FIGS. 7A-7B wherein the user/operator of the 'application' will 'map' or otherwise select, from among the set of 'all available data which pertains to the data descriptions' (41 of FIG. 7A), those items of data which pertains directly to the 'data descriptions' (37 of FIG. 7A) thereby identifying a set of 'mapped available data' (37 in FIG. 7A) among the set of 'available data pertaining to the data descriptions' (41 of FIG. 7A). When the aforementioned 'mapping' is complete, the 'data sources' will respond by transmitting the 'mapped available data' (37 of FIG. 7A) to the 'adapters' 22a-22c. The 'adapters' 22a-22c will convert the data format and the communication protocol of the 'mapped available data' to a new data format and a new communication protocol which is acceptable to the 'application', thereby generating 'modified mapped available data'. As a result, the 'adapters' will now generate the 'modified mapped available data'. The DataLink engine 22d will queue-up and pass the 'modified mapped available data' to the 'delegates' 10a, 18a, 28a of the 'application' 10, 18, 28 wherein the 'application' will use the 'modified mapped available data' during its execution by a processor, such as the processor 44a of FIG. 11. Note that the 'Recorder' 14 data source is used by a developer of the 'RT Application' 10 or 18 or 28; that is, when the developer wants to 'test' the 'RT Application', the developer utilizes the above process to request the 'test data' from the 'Recorder' 14. When the 'test data' from the 'recorder' 14 is received by the 'application', the developer will use the 'test data' to interrogate the 'RT Application' 10 or 18 or 28 for purposes of testing the functions of the 'RT Application' 10 or 18 or 28.

Figure 10:
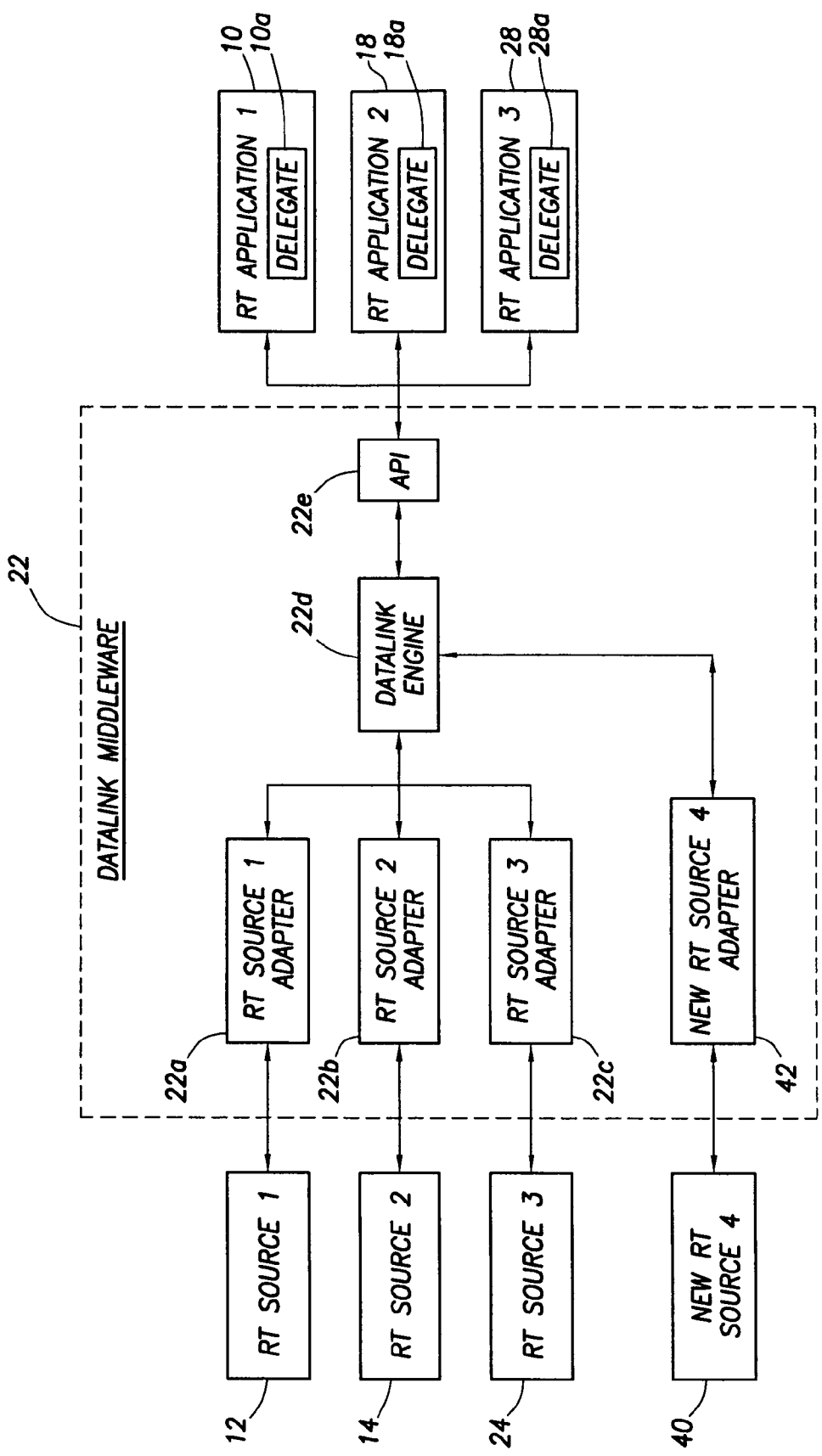
FIG. 10 illustrates another construction of the system of FIG. 5; however, in FIG. 10, a new real time data source and a new real time data source adapter has been added to the system of FIG. 5.

In FIG. 10, the system of FIG. 5 is illustrated again, including the real time (RT) sources of data 12, 14, 24, the DataLink Middleware 22, and the real time (RT) applications 10, 18, and 28. However, in FIG. 10, the following components have been added to the system of FIG. 5: (1) a new real-time (RT) source of data 'New RT Source 4' 40, and (2) a new real-time (RT) source 4 adapter 'New RT Source 4 adapter' 42 which is functionally and operationally associated directly with the 'New RT Source 4' 40. In order to add the 'New RT Source 4' 40 source of 'real time data' to the system of FIG. 10, none of the 'RT applications' 10, 18, and 28 will be capable of accepting the 'real time data' from the 'New RT Source 4' 40 unless an 'adapter' is added to the DataLink Middleware 22 in the form of the 'New RT Source 4 adapter' 42 which is associated directly with the 'New RT Source 4' 40. The adapter 42 will convert or change the data format and the communication protocols associated with the real time 'mapped available data' generated by the 'New RT Source 4' 40 to a 'new data format and a new communication protocol' that is acceptable to the 'applications' 10, 18, and 28; as a result, the 'applications' can now receive and utilize the real time 'modified mapped available data' generated by the 'New RT Source 4' 40. Therefore, the code associated with the 'New RT Source 4 adapter' 42 must be written in a special way such that the real time data generated by the 'New RT Source 4' 40 will be acceptable to, and can be used by, the RT Applications 10, 18, and 28 during the execution of the Applications 10, 18, 28 by a computer system processor, such as the computer system processor 44a illustrated in FIG. 11. Recall from FIG. 6 that the 'adapter-engine interface' 22d1 of the DataLink engine 22d is responsible for instructing each of the adapters 22a, 22b, and 22c, including the 'New RT Source 4 Adapter' 42, how the adapters 22a-22c and 42 should be written in order to properly convert or otherwise change the data formats and the communication protocols associated with the received 'data' (which was received from the data sources 12, 14, 24, and 40) into data formats and communication protocols which are otherwise acceptable to the 'RT Applications' 10 and 18 and 28.

Figure 11:
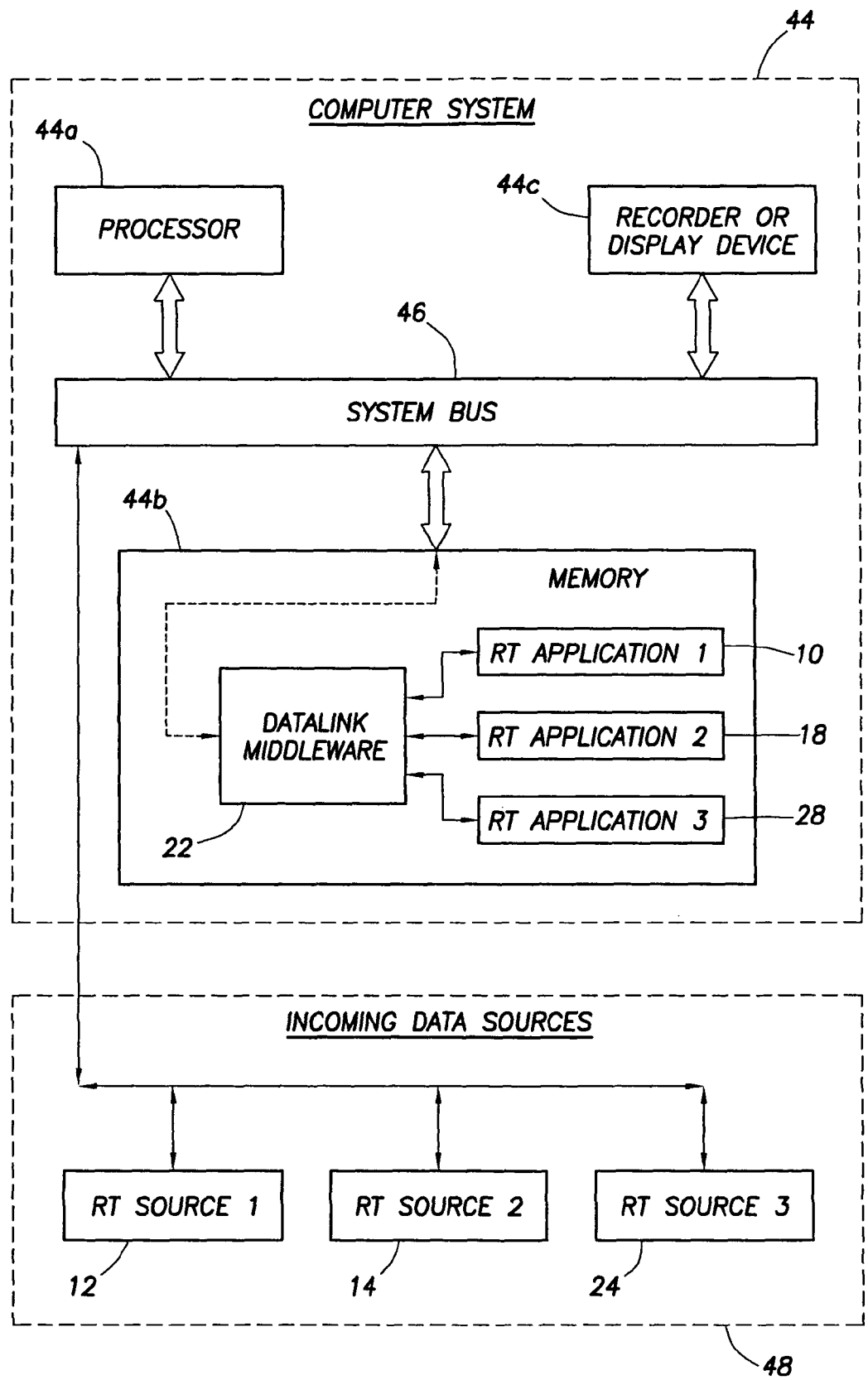
FIG. 11 illustrates a computer system responsive to one or more real time data sources adapted for storing the DataLink Middleware and one or more real time applications which are adapted to request data from the data sources via the DataLink Middleware.

In FIG. 11, a workstation, personal computer, or other computer system 44 is illustrated adapted for storing the DataLink Middleware 22 and the RT Applications 10, 18, and 28. The computer system 44 of FIG. 11 includes a processor 44a operatively connected to a system bus 46, a memory or other program storage device 44b operatively connected to the system bus 46, and a recorder or display device 44c operatively connected to the system bus 46. The memory or other program storage device 44b stores the DataLink Middleware software 22 and the following real time applications 'RT Application 1' 10, 'RT Application 2' 18, and 'RT Application 3' 28. The DataLink Middleware software 22 is owned and operated by Schlumberger Technology Corporation of Houston, Tex. The software 22, 10, 18, and 28 which is stored in the memory 44b of FIG. 11 can be initially stored on a CD-ROM, where that CD-ROM is also a 'program storage device'. That CD-ROM can be inserted into the computer system 44, and, then, the software 22, 10, 18, and 28, which includes the DataLink Middleware Software 22, can be loaded from that CD-ROM and into the memory/program storage device 44b of the computer system 44 of FIG. 11. The computer system 44 of FIG. 11 receives (as input data) the following 'Incoming Data Sources' 48, which are sources of real-time data, including: (1) the 'RT Source 1' 12 source of real time data, (2) the 'RT Source 2' 14 source of real time data, and (3) the 'RT Source 3' 24 source of real time data. The processor 44a will execute the software associated with the 'RT Applications' 10, 18, and 28 and the DataLink Middleware 22 while simultaneously using the real-time input data originating from the 'Incoming Data Sources' 48; and, responsive thereto, the recorder or display device 44c will generate a set of output data which is adapted to be recorded by or displayed on the recorder or display device 44c. Recall from FIG. 4 that a 'single user interface' 26 (a simple example of which is shown in FIGS. 7A-7B) is utilized by a user/operator of the RT Applications 10, 18, and 28 in order to 'map' the 'available data pertaining to the data descriptions' from the 'adapters' with the 'data descriptions' representing the 'requested data' from the 'applications'. In addition, recall, from the User Interface 31 of FIGS. 7A-7B, that the 'DataLink Data Descriptions' 30 comprise at least part of the aforementioned 'single user interface' 26. The 'single user interface' 26 including the 'DataLink Data Descriptions' 30 will be displayed on the Recorder or Display Device 44c associated with the computer system 44 of FIG. 11, and the user/operator will perform the 'mapping' function as discussed above with reference to FIGS. 7A-7B. The computer system 44 may be a personal computer (PC), a workstation, or a mainframe. Examples of possible workstations include a Silicon Graphics Indigo 2 workstation or a Sun SPARC workstation or a Sun ULTRA workstation or a Sun BLADE workstation. The Datalink Middleware 22 is a windows program, however, it could be converted to unix. The memory or program storage device 44b is a computer readable medium or a program storage device which is readable by a machine, such as the processor 44a. The processor 44a may be, for example, a microprocessor, microcontroller, or a mainframe or workstation processor. The memory or program storage device 44b, which stores the DataLink Middleware 22 and the 'RT Applications' 10 and 18 and 28, may be, for example, a hard disk, ROM, CD-ROM, DRAM, or other RAM, flash memory, magnetic storage, optical storage, registers, or other volatile and/or non-volatile memory.

A functional description of the operation of the DataLink Middleware 22, in connection with its function adapted for linking sources of data (such as real time data) to one or more applications (such as real time applications) executing in a processor of a computer system, will be set forth in the following paragraphs with reference to FIGS. 4 through 11 of the drawings.

Assume that the DataLink Middleware 22 and the RT Applications 10, 18, and 28 have been loaded into the memory 44b of the computer system 44 of FIG. 11 (hereinafter, the 'RT Applications 10, 18, and 28' are referred to as 'applications') and that the Incoming Data Sources 48 of FIG. 11, including the RT Sources 12, 14, and 24, are being provided as 'input data' to the processor 44a of the computer system 44 (hereinafter, the 'Incoming Data Sources 48 of FIG. 11, including the RT Sources 12, 14, and 24' are referred to as 'data sources'). Assume further that the user/operator of the 'applications' wants to request some of the 'real time data' from the 'data sources'. The 'real time data' being provided by the 'data sources' may have data formats and communication protocols which are not acceptable to the 'applications'. Therefore, the 'applications' may not be capable of functioning while using that 'real time data'. If the user/operator of the 'applications' wants to receive the 'real time data' from the 'data sources', the user will first transmit 'data descriptions' associated with the requested 'real time data' from the 'applications' to the 'data sources'. For example, assume that the requested 'data descriptions' from the 'applications' is "Survey, Log". This means that the 'application' wants to receive 'surveys' and 'logs' from the 'data source'. The requested 'data descriptions associated with the requested real time data' will be passed from the 'applications' to the DataLink Middleware 22 of FIG. 5, and the DataLink Middleware 22 will pass the requested 'data descriptions associated with the requested real time data' to the 'data sources'. In response, the 'data sources' will transmit, to the DataLink Middleware 22 of FIG. 5, a set of 'all available data'; however, the 'adapters' 22a-22c associated with the DataLink Middleware 22 will respond to the set of 'all available data' from the 'data sources' by generating a set of 'available data pertaining to the data descriptions'. In our example, since the 'adapters' 22a-22c will generate 'available data pertaining to the data descriptions', and since the assumed 'data descriptions' are 'Survey, Log', the 'adapters' 22a-22c of the Middleware 22 will generate only 'surveys' and 'logs', the 'surveys' and 'logs' representing the 'available data pertaining to the data descriptions'. The 'adapters' 22a-22c of the Middleware 22 will pass the set of 'available data pertaining to the data descriptions' (i.e., the 'surveys' and 'logs') to the API 22e. The API 22e will now setup the User Interface 31 of FIGS. 7A-7B. Since the API 22e will receive the set of 'available data pertaining to the data descriptions' (i.e., the 'surveys' and 'logs') from 'adapters' 22a-22c, and the set of 'data descriptions associated with the requested real time data' from the 'applications', the User Interface 31 of FIGS. 7A-7B will display: (1) the 'available data pertaining to the data descriptions' (i.e., the 'surveys' and 'logs') 41 of FIGS. 7A-7B, and (2) the 'data descriptions associated with the requested real time data' from the 'applications' 43 of FIGS. 7A-7B, and (3) the word 'ANY' 34 of FIG. 7A. The user/operator of the 'applications' will now 'map' or select, from among the 'available data pertaining to the data descriptions' 41 (i.e., from among the 'surveys' and 'logs' 41), 'those items which pertain directly to the 'data descriptions associated with the requested real time data' 37. For example, in FIGS. 7A-7B, the user/operator will 'map' or select, from among the set of 'available data corresponding to the data descriptions' (41 in FIG. 7A) generated from the 'adapters' associated with the Middleware 22, those 'items of data (37 of FIG. 7A) which directly corresponds to the 'data descriptions' (39 of FIG. 7A) representing the 'requested data' generated from the 'applications', thereby identifying a set of 'mapped available data'. When this 'mapping' or selection (performed by the user/operator of the 'applications') is complete, the user/operator will have identified, for the 'data sources', a set of 'mapped available data' 37 which is comprised of 'those items which pertain directly to the data descriptions associated with the requested real time data' 37. The 'data sources' will now transmit the 'mapped available data', and the 'adapters' 22a-22c of the Middleware 22 will receive the 'mapped available data'. However, if the user/operator selects the word 'ANY' 34 in the User Interface 31 of FIG. 7A, then, the user/operator will have identified, for the 'data sources', a 'set of all available data' (and not merely 'those items which pertain directly to the data descriptions associated with the requested real time data'); and, at this point, the 'set of all available data' will now be identified as the set of 'mapped available data'. The 'data sources' will transmit the 'mapped available data' to the 'adapters' 22a-22c of the Middleware 22, and the 'adapters' 22a-22c of the Middleware 22 will receive the 'mapped available data'. At this point, the 'adapters' 22a-22c of the Middleware 22 will convert or change the data format and the communication protocol of the 'mapped available data' to a new data format and a new communication protocol which is acceptable to the 'applications' 10, 18, 28; and, as a result, the 'adapters' 22a-22c will now generate a set of 'modified mapped available data' (comprised of the 'mapped available data' having the new data format and the new communication protocol which is acceptable to the 'applications'). The DataLink Engine 22d of FIG. 5 will queue-up and pass the 'modified mapped available data' from the 'adapters' 22a-22c to the 'delegates' 10a, 18a, 28a of the 'applications' 10, 18, 28 wherein the 'applications' can utilize the 'modified mapped available data' during the execution of the 'applications' by the processor 44a of FIG. 11. Recall that the 'modified mapped available data' is passed to the 'delegates' of the 'applications' in the form of 'data objects' which are the same for all 'applications'. In particular, the 'modified mapped available data' pertaining to the 'surveys data description' will be stored in the 'surveys delegate' (10a, 18a, 28a) of the 'applications' 10, 18, 28 and the 'modified mapped available data' pertaining to the 'logs data description' will be stored in the 'logs delegate' (10a, 18a, 28a) of the 'applications' 10, 18, 28. However, if the 'data description' transmitted from the 'applications' included a special notation, such as '*', then, all of the 'modified mapped available data' will be stored in 'one delegate' 10a, 18a, 28a of the 'applications' 10, 18, 28.

As a result, the requesting application (i.e., RT Application 10) is not concerned about the origin of the 'requested data' and, in addition, the RT Application 10 is not concerned about the data format or the communication protocol of the 'requested data'. As long as an 'adapter' 22a, 22b, and 22c is associated, respectively, with each of the sources of real time data, namely, RT Sources 12, 14, and 24, the requesting application (RT Application 10) is not concerned about the origin or the data format or the communication protocol of the 'requested data'. In addition, since there is a 'single user interface' 26 of FIG. 4, the user/operator need only learn one 'single user interface' 26 in order to request the real time data from any one or more of the plurality of data sources (i.e., RT Sources 12, 14, and 24).

Furthermore, the 'adapter engine interface' 22d1 of FIG. 6 will instruct the adapters 22a, 22b, and 22c how such adapters 22a-22c should be written or coded in order to properly convert the data formats and the communication protocols of the 'real time data' being received from the data sources (RT Sources 12, 14, 24) into a data format and a communication protocol that is acceptable to the requesting application, such as 'RT Application 1' 10.

In addition, referring to the 'HUB' configuration shown in FIG. 8, the 'application' 10, 18, or 28 will request 'real time data' (hereinafter called 'requested data') from the data sources 'RTS 1' 12, 'RTS 2' 14, and 'RTS 3' 24 by sending one or more 'data descriptions' associated with the 'requested data' to the 'data sources'. The DL 22.4 will pass the 'data descriptions' to the HUB 36, and the DL 22.1, DL 22.2, and DL 22.3 will pass the 'data descriptions' from the HUB to the 'data sources' 12, 14, 24. In response thereto, the 'data sources' 12, 14, 24 will transmit 'all available data' back to the DataLink Middleware apparatus DL 22.1, DL 22.2, and DL 22.3; however, the 'adapters' 22a-22c associated with the Middleware DL 22.1, DL 22.2, and DL 22.3 will respond to the 'all available data' from the 'data sources' by generating a set of 'available data corresponding to the data descriptions'. The API 22e in each of the DL 22.1, DL 2.2, and DL 22.3 will set up and display the User Interface 31 of FIGS. 7A-7B on the user/operator's computer display screen (i.e., on the recorder or display device 44c of FIG. 11). Using the User Interface 31, the user/operator will now 'map' the following two items together which will thereby generate 'mapped available data': (1) the 'available data corresponding to the data descriptions' from the 'adapters' 22a-22c of the Middleware DL 22.1, DL 2.2, and DL 22.3 with (2) the 'data descriptions' representing the 'requested data' from the 'applications'. The term 'map' or 'mapping' means that the user/operator will select, from among the set of 'available data corresponding to the data descriptions' (41 in FIG. 7A) generated from the 'adapters' associated with the Middleware DL 22.1, DL 2.2, and DL 22.3, those 'items of data (37 of FIG. 7A), which directly corresponds to the 'data descriptions' (39 of FIG. 7A) representing the requested data', thereby identifying 'mapped available data'. When this 'mapping' is complete, the 'data sources' 12, 14, 24 will now transmit the 'mapped available data' to the DL 22.1, DL 2.2, and DL 22.3, the 'mapped available data' corresponding to the aforementioned 'items of data which directly corresponds to the data descriptions representing the requested data' (37 of FIG. 7A). Note that the 'mapped available data' is usually a subset of the 'available data' from the 'data sources'. At this point, the DL 22.1 has received a first subset of 'mapped available data', the DL 22.2 has received a second subset of 'mapped available data', and the DL 22.3 has received a third subset of 'mapped available data'. The 'adapters' 22a-22c of the DL 22.1, the DL 2.2, and the DL 22.3 will now each 'convert' the data format and the communication protocol associated with the first subset of 'mapped available data' and the second subset of 'mapped available data' and the third subset of 'mapped available data' to a 'new data format and a new communication protocol' which is acceptable to the 'application' 10 or 18 or 28; and, as a result, when these 'conversions' are complete, the DL 22.1 will generate a 'first subset of modified mapped available data' and the DL 22.2 will generate a 'second subset of modified mapped available data' and the DL 22.3 will generate a 'third subset of modified mapped available data'. The aforementioned 'first and second and third subsets of modified mapped available data' will now be stored in the HUB 36. The API 22e of DL 22.4 will now set up the User Interface 31 of FIGS. 7A-7B so that the user/operator of the 'application' 10 or 18 or 28 can select, from among 'the first subset of modified mapped available data and the second subset of modified mapped available data and the third subset of modified mapped available data' which is stored in the HUB 36, that 'data which shall be immediately received by the application 10 or 18 or 28'. The 'adapters' 22a-22c of the DL 22.4 will now convert (where necessary) the data format and the communication protocols of the 'data which shall be immediately received by the application 10 or 18 or 28' to a data format and a communication protocol which is acceptable to the 'application' thereby generating 'further modified mapped available data'. The 'DataLink Engine' 22d of the DL 22.4 will now queue-up and pass the 'further modified mapped available data' to the 'delegates' of the 'application' 10 or 18 or 28. The 'application' 10 or 18 or 28 is now ready to execute its programs while using the 'further modified mapped available data'. The 'further modified mapped available data' is passed to the 'delegates' of the 'applications' in the form of 'data objects' which are the same for all 'applications'.

In summary, data from wireline and drilling tools has traditionally been provided by many data sources (such as InterACT, IDEAL, Horizon, WITSML, WITS, etc). These sources each use a different protocol for providing data or are protocols in themselves. In general, there are modifications to each of these sources on a regular basis. In application development, it is necessary to select a set of 'data sources' that will be supported by the applications. This in itself can be difficult and is usually driven by what is most easily accessible to the application development team. For some data sources (such as InterACT, IDEAL, and Horizon), each time a new application needs data, another stakeholder is added to their development which increases the level of risk and in general slows overall development speed. From experience, the ability to switch between sources is, at best, difficult and is easily broken by modifications to the underlying protocol that occur when new versions of the sources are deployed. At worst, a switch to another source can completely destroy a product because the underlying architecture cannot support such a modification. Another issue during development of these applications is testing. When the application is using real-time data, development and testing are difficult and are usually done by connecting to what is convenient to the development team. Connection to actual real-time sources or even simulation of actual real-time data into an application is usually not done until field test, which in some cases can be too late to affect the architecture of a system under development. For the end user, the connection to a source has always been difficult due to the multitude of data sources and the plethora of products used to connect to each individual source. In many cases, users choose not to connect to a source due to this complexity in learning a new User Interface (UI) for establishing the connection. A reliable and usable Graphical User Interface (GUI) for establishing the connection is usually problematic to create because the access to the 'data source' comes so late in the development cycle.

The DataLink Middleware 22 of FIGS. 4 and 5 disclosed in this specification will:

(1) simplify the creation of 'applications' 10, 18, 28 requiring access to real-time and recorded real-time data 12, 14, 24 (e.g., drilling data) on a windows platform,
(2) decrease dependency risk on the 'data sources' 12, 14, 24 (such as InterACT, IDEAL, and Horizon), and
(3) provide the end user with a consistent and intelligent User Interface (UI) for establishing a data source connection across multiple 'DataLink middleware enabled' applications.

In particular, the DataLink Middleware 22 of FIGS. 4 and 5 will solve these issues for three sets of users: (1) the end users, (2) the application development teams, and (3) the 'data source' teams, each of which will be discussed below.

For the end users—The DataLink Middleware 22 will provide a common User Interface (UI) and ultimately a multitude of 'adapters' 22a, 22b, and 22c of FIG. 5 that can intelligently connect to a 'data source' 12, 14, 24, which can include a source of drilling data. Updates to the 'adapters' 22a, 22b, 22c can be performed automatically from the web and new 'adapters' to 'new data sources' can be easily added to an application without having to redeploy the entire 'application'.

For the application development teams—The DataLink Middleware 22 provides a common API 22e (or a common User Interface 26 of FIG. 4) that is completely independent of the data source (12, 14, 24) being accessed. In addition, it is not necessary to develop a 'unique User Interface (UI)' for connection to a 'particular data source' because the DataLink Middleware 22 generates the 'single User Interface' 26 of FIG. 4 which is usable by the end user for the end user's connection.

For the 'data source' teams—only one connection (from the 'data source' 12, 13, 24 to the 'DataLink Middleware' 22) is required for the purpose of providing data from the 'data source' 12, 14, 24 to the 'applications' 10, 18, 28. Working closely with one group will enable all existing and new 'applications' (10, 18, 28) that must be 'DataLink Middleware enabled'.

In addition, the 'DataLink Middleware' 22 will include one or more 'Adapters' 22a, 22b, and 22c of FIG. 5 associated, respectively, with the one or more 'data sources' 12, 14, and 24, a unique and specially designed 'adapter' 22a, 22b, and 22c being required for connection to each changing 'data source' 12, 14, 24.

The 'DataLink Middleware' 22 will provide end users and application developers with a single point of access to multiple data sources. As a result, the end users and application developers are insulated against any changes in the data sources. This should allow a 'DataLink enabled' application to acquire data from multiple data sources without requiring any changes or modifications to the 'DataLink enabled' application. End users will also benefit from having a common User Interface (UI) 26 across multiple 'applications' (10, 18, 28) in order to connect to and setup the data needed by their 'application'. For the end-user, the connection setup will be persisted by the applications so that connections can easily be re-established across sessions.

Software Requirements

In the following, the term 'DataLink' refers to the 'DataLink Middleware' 22 of FIGS. 4 and 5.

Overall Description

In its simplest terms, the DataLink project will simplify the creation of applications requiring access to real-time drilling data on a windows platform; decrease risk on real-time source applications such as InterACT, IDEAL, and Horizon; as well as provide the end user with a consistent and intelligent UI for establishing a real-time connection across multiple DataLink enabled applications.

Product Perspective

Today, real-time data from wireline and drilling tools is provided by many sources, such as InterACT, IDEAL, Horizon, WITSML, WITS, etc. These sources use a different protocol for providing real-time data or are protocols in themselves. In general, there are modifications to each of these sources on a regular basis. For example, between year 2000 and 2004, there were seven commercial release of IDEAL. For Horizon, one can anticipate a rate greater than the IDEAL rate due to the relatively young age of the system.

In application development, we are faced with the choice of selecting the set of real-time sources that will be supported by our applications. This in itself can be difficult and is usually driven by what is most easily accessible to the application development team. For the real-time sources, InterACT, IDEAL, and Horizon, each time a new application needs real-time data, another stakeholder is added to their development and increases the level of risk and in general slows overall development speed. From experience, the ability to switch between real-time sources is, at best, difficult and is easily broken by modifications to the underlying protocol that occur when new versions of the real-time sources are deployed. At worst, a switch to another real-time source can completely destroy a product because the underlying architecture cannot support such a modification. Another issue during development of real-time enabled applications is testing. To test real-time data during development is difficult and is usually done by connecting to what is convenient to the development team. Connection to actual real-time sources or even simulation of actual real-time data into an application is usually not done until field test, which in some cases can be too late to affect the architecture of a system under development.

For the end user, the connection to a real-time source has always been difficult due to the multitude of real-time sources and the plethora of products used to connect to each individual source. In many cases, users choose not to connect to a real-time source due to this complexity in learning a new UI for establishing the connection. A reliable and usable GUI for establishing the connection is usually problematic to create because the access to the real-time source comes so late in the development cycle.

Product Functions

DataLink will solve issues for three sets of users: the end users, the application development teams, and the real-time source teams. These issues solved by each user group are:

For the end users, DataLink will provide a common UI and ultimately a multitude of adapters that can intelligently connect to a source of real-time drilling data. Updates to adapters can be performed automatically from the web and new adapters to new real-time source can be easily added to an application without having to redeploy the entire application.

For the application development teams, DataLink provides a common API that is completely independent of the real-time source being accessed. In addition, the time required to develop a UI for connection to a real-time source does not have to be done as DataLink provides all UI for the end users connection.

For the real-time source teams, only one connection to provide real-time data needs to be addressed and working closely with that one group will real-time enable all existing and new applications that are DataLink enabled.

Constraints

DataLink: (1) is not intended to be a generic real-time data delivery service or to replace broad data schemas like WITSML. It is intended to focus solely on a limited set of real-time and historical data associated with drilling and wireline. Currently limited to drilling data, but can be applied to any other domain; and (2) is for use only on a PC Platform; although currently only implemented for use with PCs, it could be converted to unix Assumptions and Dependencies DataLink is heavily dependent on interaction with the real time source groups and the real time applications groups.

Specific Requirements

The following sections describe the specific requirements by category.

Functionality

This section outlines both the end user and API user (application programmer) activities that are employed for using DataLink to load real-time data from a particular source that the user has an adapter for. Requirements are ordered according to the usual workflow, and labeled as to whether it is an end user or API user level requirement.

User Selection of Real-Time Source (End-User)

The user starts by selecting a real-time source. The user can choose from a list of available sources (adapters). The user can load from previous settings, or specify and optionally save new settings for a particular adapter.

User Test of Specified Real-Time Source (End-User)

After the set up of the source has been specified, the user can test to make sure that DataLink is able to connect to the source. An error message will be provided if the user cannot connect to the source with the current settings, a success message will be provided if the user is able to connect. In the case of connection failure, DataLink will return and display all textual and numeric (i.e., error code) diagnostic information from the source, to give the end user the greatest chance of figuring out what went wrong.

Details of Specified Real-Time Source Adapter (End-User)

The user will be able to see the version, build and date of the specified real-time adapter. The user will also be able to update the adapter version if available. DataLink will not verify that source and adapter are compliant.

Available Data (End-User & API)

The user will be able to see the available data that DataLink will be able to transfer from the real-time source to the application. The application can choose to have DataLink only provide a subset of all available data (in the case where perhaps the application does not support all of the data that is available through DataLink). The user can then specify which data DataLink that should transfer to the application (can be all or a subset).

The API will only support the following data types to be loaded: (1) Trajectory (stationary, continuous, historical), (2) Real-time channel data (time and depth), (3) Historical Log (time and depth), (4) Images (to be defined), and (5) Text message stream Risks/Events Saving DataLink Configuration File (End-User)

The user will be able to save settings for a particular adapter in a configuration file. This will save all the set up details of the adapter, and also the subset of data (mapping) that is specified to be transferred. If a user name and password are required to connect to a particular source, the user name, but not the password will be saved. Configuration files will be persisted by the individual applications and not by DataLink itself. Also, when a configuration file is used, the user will have the option to "Quick Connect" and directly start loading data, without having to specify or even view the data mapping.

Loading the Data (End-User)

The user will then be able to start loading the data. There will be a control that will show the "heartbeat" to let the user know that data is currently loading. The user can stop loading at any time. If the user stops and restarts the same load, the load will resume at the current time or depth. If the system goes down (the application, power supply, etc.) then DataLink must be restarted and the load will not pick up where it left off. The user may also change the mapping information as the system is loading data. In this case, DataLink will immediately start transmitting the updated mapping as soon as the user creates the new mapping.

Help (End-User)

At any point during the DataLink session the user will be able to get help. Help will be provided to the applications in the form of html and word documents with the Petrel template. Help will be done using RoboHelp.

Applications (End-User & API)

Initially DataLink will be used by several applications: an example application that DataLink will provide, Perform Toolkit 1.0, Perform Toolkit 2.0 and Petrel. This list is expected to grow as the project progresses.

The DataLink team will work with these application groups on creating the APIs, based on their requirements.

New Versions (End-User)

The user will not have to reinstall DataLink every time a new adapter is made available. Rather the user can install the new adapter into the adapter directory, either from downloading it on the web, or from other means (email, CD, etc.) and the next time DataLink is run it will detect the new adapter from the adapter directory and it will appear in the list of available sources/adapters.

Multiple Instances (End-User & API)

DataLink will only allow one load of one source per instance of DataLink. The application may allow more than one instance of DataLink to be running at the same time (this choice will be up to the applications, however the DataLink API will not impose any restrictions on this).

Source Simulator and Recorder (API)

The real time recorder simulator needs to record timestamp, and the playback should be able to control the playback speed (×1, ×10, ... ). This will be used for testing by the application developers, to test their use of DataLink APIs. The format of the recorder will be witsml streaming, with headers defined by DataLink. The recorder will create the witsml streaming files. The simulator will be the witsml streaming adapter.

Security (End-User)

The link between the source and adapter will be secure. DataLink will not compromise security, but security is only as good as provided by the source.

Writing Back Data (End-User & API)

DataLink will enable applications to write back a limited set of processed data objects to real time servers (e.g. InterACT). DataLink will write back channel data to witsml servers via the witsml api and will also allow applications to upload files to InterACT.

Logging (End-User & API)

DataLink will provide messaging/diagnostic outputs that are logged to the applications.

Streaming File Adapters (Future Version, for DataServer Streaming Files)

When using file streaming adapters, the user will have the option to have the system continue to check for new files that will be created. If a new file is created, the current mapping will be used, no matter what is contained in the new file. If this option is not selected, then DataLink will stop loading data whenever it reaches EOF in the last time-stamped file in the location or directory that was specified. Additionally, the user will only be able to specify one location or directory for where streaming files are located.

Usability

Natural Workflow for the User

The user actions required to load real time data should be straightforward and obvious. The real-time source set-up will require some familiarization by the user, however, the overall interface should be easy to use and easy to learn.

Ease of API Usage by Applications

The APIs that are provided to the applications should be straightforward and easy to understand. An example application will be provided, as well as documentation. Each application should be able to use DataLink APIs in their application within a 2 week timeframe. It should be easy to use and easy to learn.

Ease of Adapter Creation

The creation of new adapters should be straightforward and easy to understand. Example adapters will be provided.

Reliability

Source Reliability

DataLink is heavily dependent on the reliability of the sources. If a source goes down or there is no available data to be sent, then DataLink will be waiting for data and the "heartbeat" will stop beating. This may or not mean that the user will need to reconnect to the source, depending on the source. If DataLink can detect status, then this will be made available to the application/user. If a source goes down, it should not have negative impact on the application, other than it not receiving data.

Application Reliability

DataLink is not dependent on the reliability of the application using it, however the end user might perceive problems with the application to be problems with DataLink.

Performance

Loading of Real-Time Data

The time required to load real time data should not be significantly longer than if the applications were directly accessing the data source themselves. For Perform Toolkit we can measure the performance before and after using DataLink. This will enable us to measure if there is any significant degradation caused by using the APIs.

Set-Up and Establishing Connection

There should be quick and efficient performance when setting up and establishing the connection to the data sources. It should not take significantly longer than if the user were to directly establish a connection to the data source themselves.

Design Constraints

Implementation

The software will be implemented using .net C# (framework version 1.1) and is intended for use with windows applications on Windows 2000 and Windows XP, and using standard C++ or .net Adapter Versions Initial versions of DataLink will be compatible with the current version of IDEAL, Witsml API 1.2 and 1.3, and DataServer streaming files (RT & RTT). The DataLink architecture will be designed to be easily extendable to support new source/adapter versions and additional data objects from sources.

API Versions

DataLink features can be expected to change and evolve, and as such, the implementation technology and components will change.

Developer Testing

Nuint will be used for unit testing by the software developers.

Process

Development will follow the RUP and Scrum process for a small project.

On-Line User Documentation and Help System Requirements

New documentation to describe the system will be required. This will be end user documentation and application development documentation. Also, an example application and source simulator and recorder will be provided.

Purchased Components

The .net development environment (c#) and NUnit (free) will be used.

Interfaces

User Interfaces

One dialog needs to be created to support the selection and loading of real time data. This dialog will support selection of real time sources, loading/creating set-up files, reporting of information for a specified source, selecting particular data to load for a source, and help. Subsidiary dialogs may be required to view/edit this information. DataLink will provide a dialog to incorporate into the applications that will provide a standard user interface.

Software Interfaces

DataLink will create a set of APIs so that applications may use DataLink to load real time data. DataLink will provide the user interface, so that each application will have the same look and feel. Applications may not customize or change this user interface.

Software Architecture

Purpose: This document provides a comprehensive architectural overview of the system, using a number of different architectural views to depict different aspects of the system. It is intended to capture and convey the significant architectural decisions which have been made on the system.

Definitions, Acronyms, and Abbreviations

ADD—Available Data Description

DD—Data Description

DDL—Data Description List

DL2—DataLink

RDD—Requested Data Description

RT—Real-time

Meta-Architecture: Beyond what is specified with the SIS Architectural Blueprint, the following additionally apply.

Vision: DataLink abstracts real-time sources from end-users and developers of real-time enabled applications making it easier to develop, deploy, support, and maintain applications as well as making it consistent for end-users to connect to real-time data sources.

DataLink will be the definitive way of accessing real-time drilling data for all Schlumberger Microsoft Windows based applications.

Principles: Must be simple to use from developer point of view, must be simple to use and consistent from end user point of view, end-user metaphor must be easy to understand, abstract all real-time sources, testability is a key feature of DataLink both from developer using DataLink and DataLink developers, do not interpret, modify, convert, or analyze any data.

Key Concepts and Mechanisms (Conceptual Architecture)

Refer now to FIG. 9.

In FIG. 9, the conceptual architecture diagram of FIG. 9 illustrates the relationship between the RT application (top right) to various RT sources (Slb::DataHub, IDEAL, and a Test Adapter). There are four key parts to the diagram.

In FIG. 9, note how the RT application uses DataHub. This part illustrates that a RT application connects to DataLink::Kernel using the DataLink::API. The API constructs objects used to setup an adapter and data mapping, requested data, and to control the DataLink real-time connection. The API also describes all interfaces that will be used by the RT application for handling data and DataLink status. RT data is delivered to .NET delegates provided by the RT application.

In FIG. 9, the top left part of FIG. 9 illustrates the key concept of using DataLink and the abstraction of a RT behind an adapter. The IDEAL system is used here as an example RT system. An adapter provides several key items to the DataLink::Kernel including available data descriptions, WinForms user controls for specific adapter setup information, and finally, the real-time data itself.

In FIG. 9, the bottom left illustrates a testing/playback scenario. In this scenario, a RT Recorder, which is a type of RT application, records data to an intermediate file. This intermediate file is used by the TestAdapter to playback to the DataLink::Kernel and then onto a RT application. WITSML 1.3 will be used as the basis for the file format.

In FIG. 9, the bottom right shows a RT application (DataLink::Loader) which pushes data into the Slb::DataHub. This illustrates a possible use of the DataLink system to provide the ability to load data into another RT aggregator, like the Slb::DataHub. The RT loader can communicate directly to the Slb::DataHub, or write back through Slb::DataLink to a source which can accept data writes.

Logical View

Overview

This section will describe the key subsystems structure.

API

One of the primary concerns of this subsystem is to define the key interfaces that are used and unlikely to change. There are several key pieces to this: Data, Data Requests, Data Delegates, Setup, Factory, and DataLink control. These are described in the remainder of this sub-section.

Figure 12:
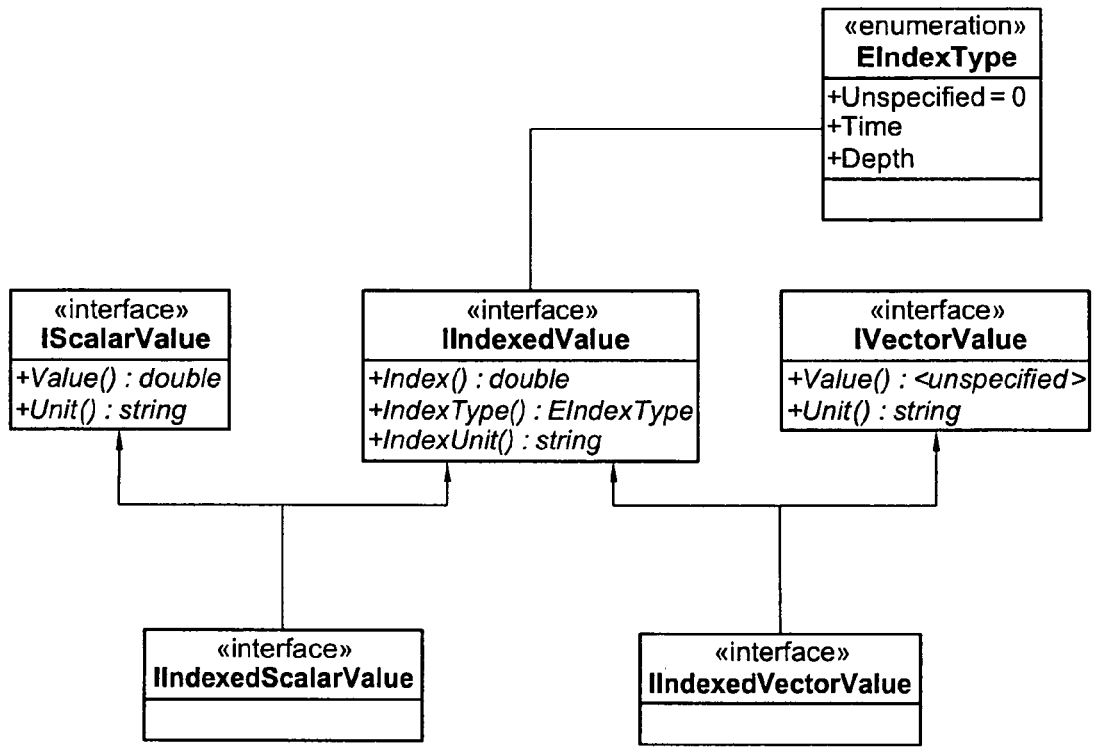
FIG. 12 illustrates a hierarchy describing several types of values which include scalar and vector values and which may or may not be indexed.

Refer now to FIG. 12.

Value Types and Data

In FIG. 12, the hierarchy of FIG. 12 describes several types of values which include scalar and vector values, which may or may not be indexed. It is possible to specify a unit associated with a value or index. The DataLink::Kernel implements the Data and Value interfaces, Adapters may also create classes that implement these interfaces for the RT application to consume.

One thing to notice about this is that Unit is just a string. DataLink does not support construction of unit systems or even compatibility checks of units when data is passed. The RT application must be able to understand the unit types provided by the adapters.

Figure 13:
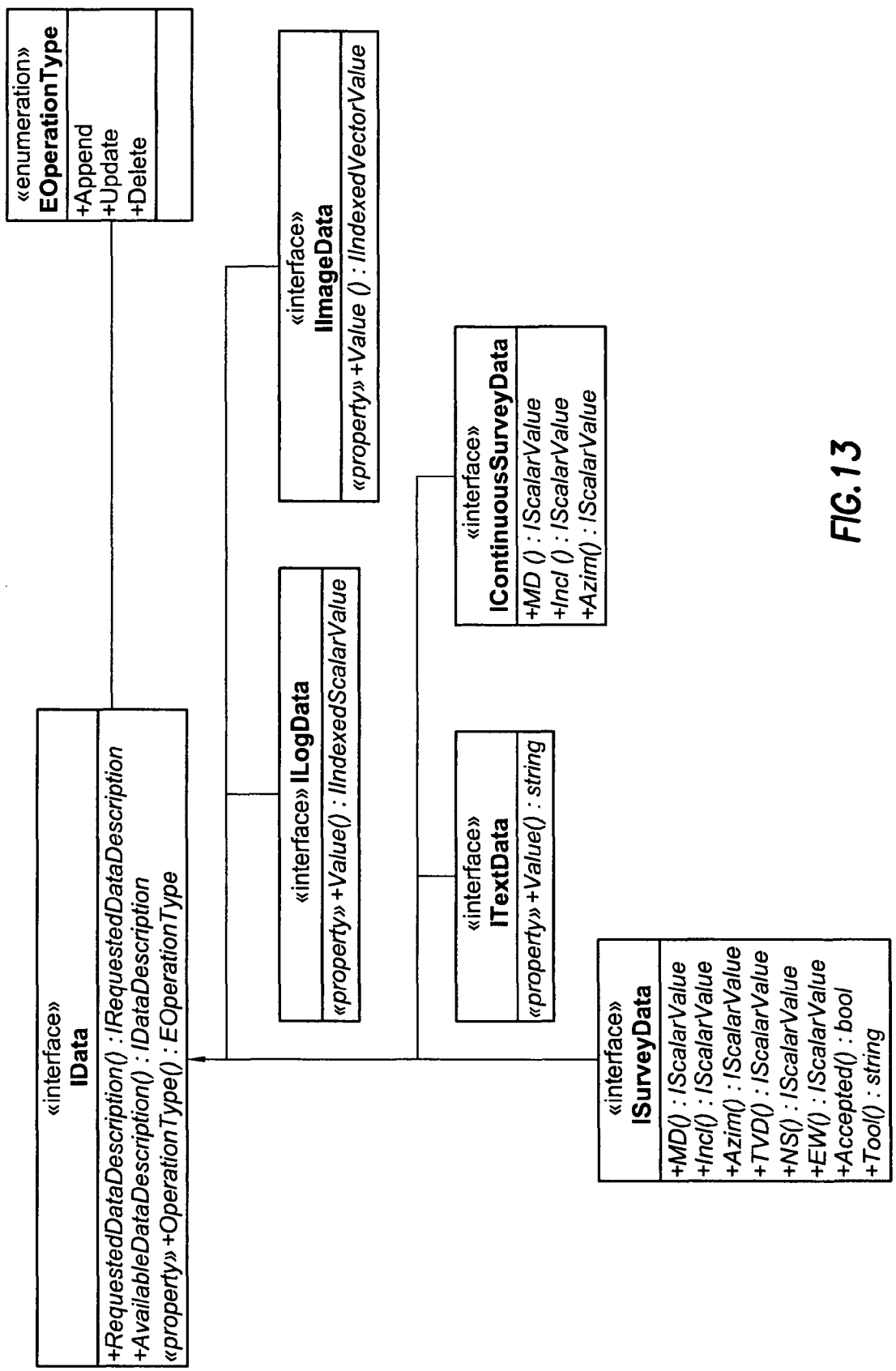
FIG. 13 illustrates a hierarchy of data types.

Refer now to FIG. 13.

Data objects use the value types described above to encapsulate the data values along with an index and units. The hierarchy of data types is shown in FIG. 13.

IData, the parent of the data hierarchy, stores references to the requested data description and the available data description that was used to generate them. In this way it is possible for the application to get at the underlying channel names or specific channel information associated with them. In addition, IData also has the operation type that occurred. This is particular important for the implementation of WITSML API which may (not decided as of date of writing) store a log of changes that occurred to a particular channel.

Figure 14:
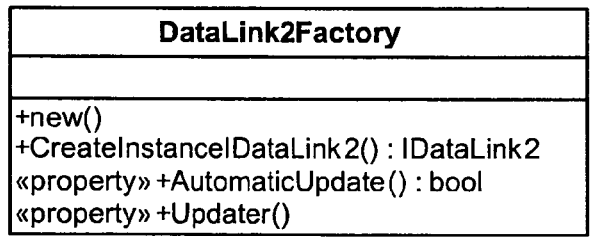
FIG. 14 illustrates the definition of the DataLink Factory.

Refer now to FIG. 14.

Describing Data and DataLink Control (DataLinkFactory, IDataLink, IDataDescription, and IRequestedDataDescription)

In FIG. 14, from the RT application point of view, the DataLinkFactory creates objects that implement the IDataLink interface needed to start and control the flow of data to the RT application. In addition, the DataLinkFactory has a method which will allow the application to control the method by which it is possible to update the DataLink::Kernel and Adapters. The definition of the DataLinkFactory is shown in FIG. 14.

The DataLinkFactory has additional methods to allow for automatic updates of the Kernel and Adapters as well as a method of providing an Updater object to allow for custom control of the update process. Little detail is provided concerning the Updating of DataLink which is to be covered in a later elaboration phase of this project. This is not expected to have any significant impact on the architecture described herein.

Figures 15, 18, 19:
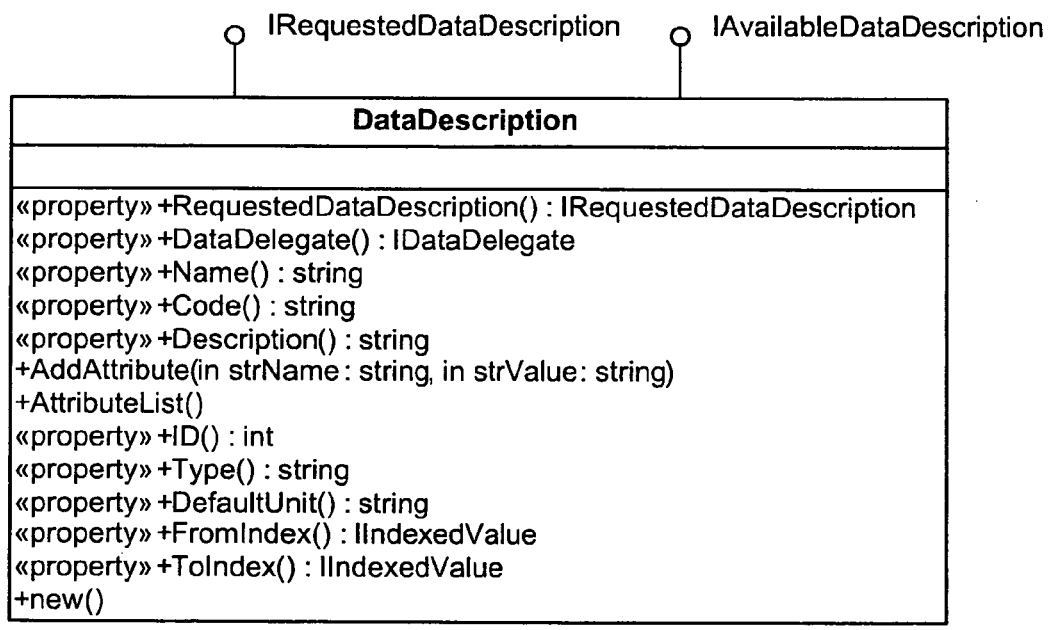
FIG. 15 illustrates the IDataLink interface.
FIG. 18 illustrates DataDescription where the DataDescription class implements the API::IRequestedDataDescription and the Kernel::IAvailableDataDescription interfaces.
FIG. 19 illustrates IAdapter where IAdapter defines the adapter interface which all adapters must implement.

Refer now to FIG. 15.

In FIG. 15, the primary method of the DataLinkFactory is for getting an object that implements the IDataLink interface. The IDataLink interface is shown in FIG. 15.

Using the IDataLink interface, the RT application creates requested data descriptions, Requests them, Connects to a RT Source, and Disconnects when done. Other methods in this class allow for getting status information, resetting the requested data description list, and writing back data to the RT Source. Additionally, the rate at which the IDataLink sends data updates to the RT application can be set using this interface.

A requested data description is a key piece of DataLink that an application developer must use to describe a requested set of data. The RT application gets instances of IRequestedDataDescription from the IDataLink interface, fills in the appropriate information and then provides to the IDataLink interface as a Request. A Request should return false if the RequestedDataDescription is not filled in appropriately. An IRequestedDataDescription contains methods for setting a name (required), code, description (required), ID, type (required), a default unit, a data delegate (required), and to/from indices.

Figure 16:
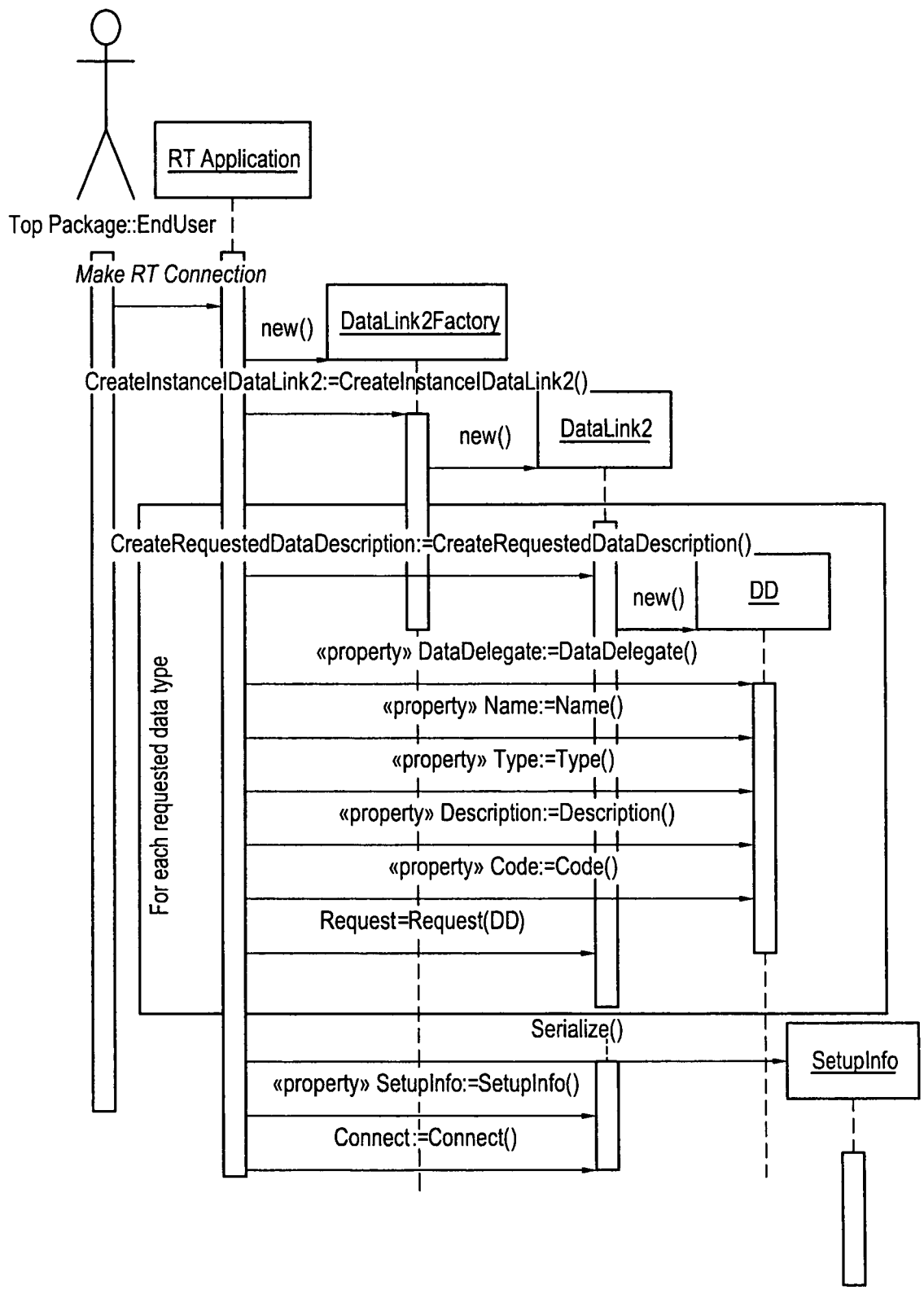
FIG. 16 a sequence diagram including the steps that a Real Time application must do in response to a user wanting to make a Real Time connection; at the end, the application is waiting for a DataLink Graphical User Interface (GUI) to be filled in by the user; after this, the data should be flowing, otherwise, the 'DataLink' connection has been cancelled.

Refer now to FIG. 16

In FIG. 16, a sequence diagram is illustrated that covers the steps needed to use these components to receive real-time data. The sequence stops at the point where DataLink has begun to setup the connection.

DataDelegate

The DataDelegate is a NET delegate which the RT application must provide. This delegate will receive all data for that particular data description.

Figure 17:
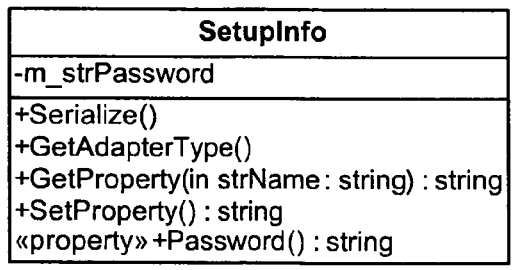
FIG. 17 illustrates SetUpInfo where set up information is stored in an object of class SetupInfo; this is a simple class which keeps a hash of property names and values; a password is stored as well in the object but is not to be persisted on disk; all properties are serialized.

Refer now to FIG. 17.

SetupInfo

In FIG. 17, Setup information is stored in an object of class SetupInfo. This is a simple class which keeps a hash of property names and values. A password is stored as well in the object but is not to be persisted to disk. All properties are serialized.

Serialization of a SetupInfo object is expected to be performed by the application. No common method of transferring this information between different applications is supported. This was done intentionally because the storage paradigm between applications is different as is their usage and expected mappings of requested to available data descriptions.

DataLink::Kernel

The key parts of the DataLink::Kernel are described here.

Refer now to FIG. 18.

DataDescription

In FIG. 18, the DataDescription class implements the API::IRequestedDataDescription and the Kernel::IAvailableDataDescription interfaces.

Refer now to FIG. 19.

IAdapter

In FIG. 19, IAdapter defines the adapter interface which all adapters must implement.

AdapterManager

Discovers adapters installed on the system and provides instances of all adapters. Adapters are expected to be very lightweight until connected to.

IAdapterSelectorControl

The IAdapterSelectorControl is a WinForms UserControl for setting up an adapter. This is expected to be implemented by the Adapter.

DataDispatcher

The DataDispatcher receives RT data from an adapter via a DataQueue (most likely a .NET System.Collections.Queue). The Dispatcher then examines the IRequestedDataDescription and sends the data to the data delegate specified. The DataDispatcher (part of DataLink::Kernel) is responsible for sending all data to the RT application and for notifying the delegates provided. The DataDispatcher will call the appropriate delegate for each piece of data received. If data storms are a concern for the application, it is up to the application to create an appropriate buffer or internal data queue to prevent such problems. Additionally, the update rate can be set by the application via the IDataLink interface.

Figure 20:
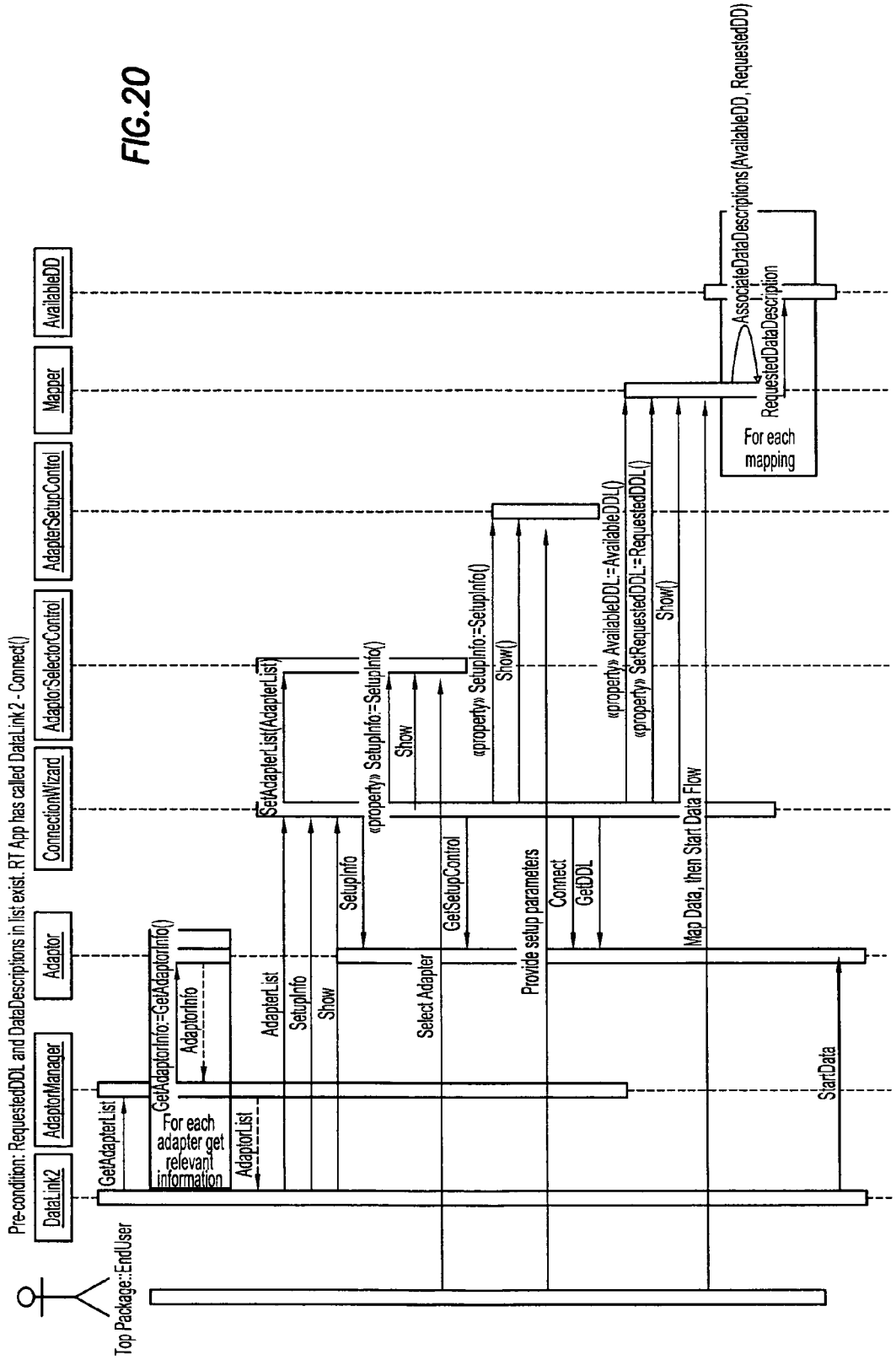
FIG. 20 illustrates a sequence diagram which further illustrates how the DataConnectionWizard uses the various user controls for adapter selection, adapter setup, and data mapping to illicit information from the user.

Refer now to FIG. 20.

DataConnectionWizard

In FIG. 20, the sequence diagram of FIG. 20 illustrates how the DataConnectionWizard uses the various user controls for adapter selection, adapter setup, and data mapping (Mapper) to illicit information from the user.

Adapter

Adapters are expected to implement the IAdapter and IAdapaterSetupControl interfaces, which are appropriate to that particular adapter.

Figure 21:
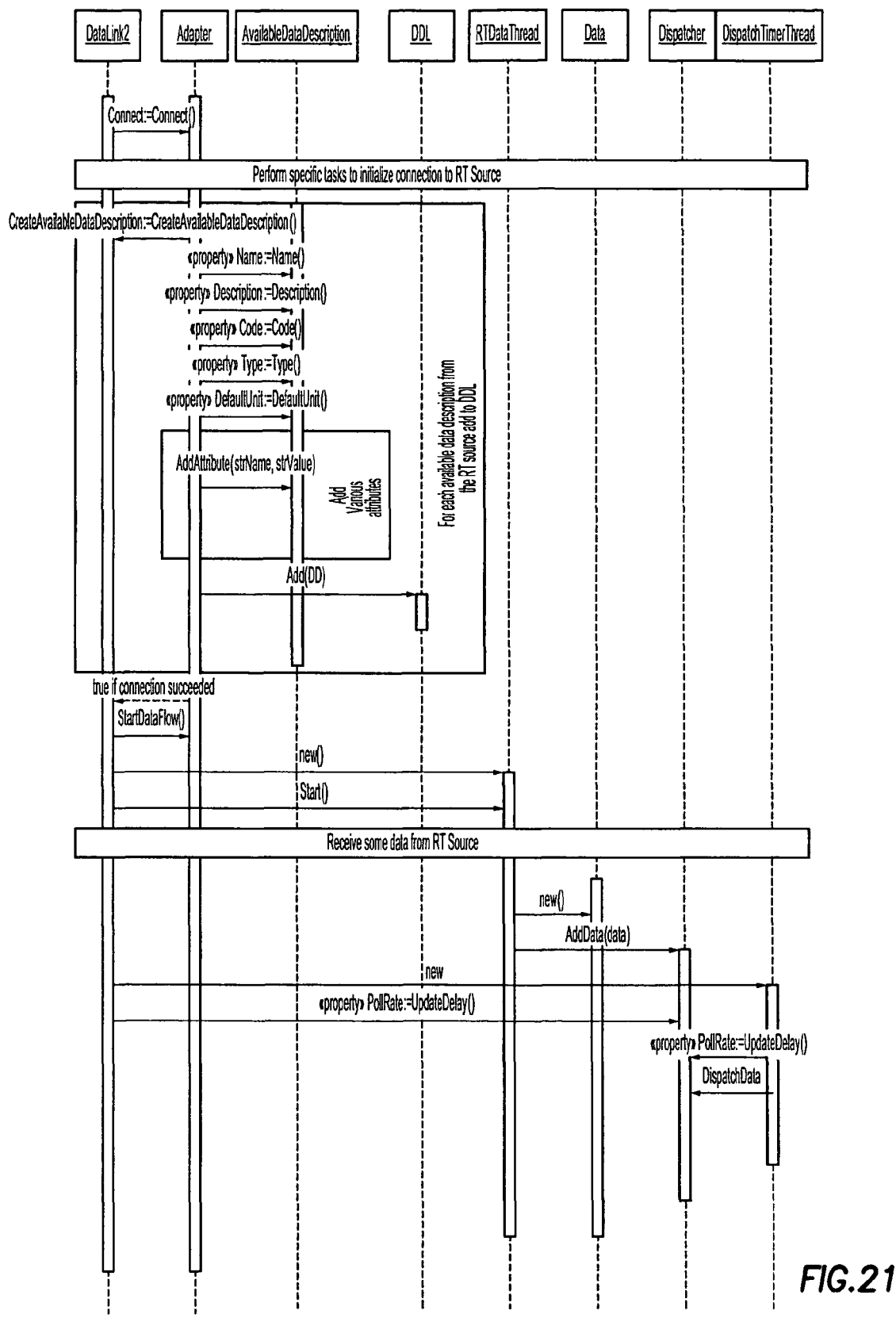
FIG. 21 illustrates a sequence diagram which further illustrates how a generic adapter is expected to connect to a Real Time (RT) source, acquire available data descriptions and deliver real-time data.

Refer now to FIG. 21.

In FIG. 21, the adapters will for the most part be developed using existing code so discussing the architecture for a specific adapter is not necessary. However, the sequence diagram of FIG. 21 illustrates how a generic adapter is expected to connect to a RT source, acquire available data descriptions and deliver real-time data.

Deployment View

DataLink is expected to be installed with an application; this includes the API, Kernel, and Adapters. It will be possible to update the DataLink::Kernel and DataLink::Adapters using an Updater object or via Automatic updates (e.g. BITS). These methods of updates are expected to use an MSI file that most likely will be on some network resource.

The API is expected not to change during an update to DataLink, i.e. only the Kernal and Adapters may be updated.

Extensibility

The architecture of DataLink was designed with care to allow the system to grow (if necessary) to easily encompass new adapters and to allow major updates to the Kernel and Adapters without affecting the RT application. The interfaces and their definition at the appropriate levels have allowed this to occur.

Usability

From the RT application developer's point of view, the API provides the smallest number and size of interfaces that are required to use DataLink. By just reviewing that portion and the connect sequence diagram in this document, it should be possible for the developer to quickly RT enable an application. However, performance specific tuning may be required in the RT application delegates to assure that the application can handle the data rates which may be delivered with DataLink from the RT Source. Additionally, the RT Recorder application will be available to show an actual example of DataLink implemented within an application.

From the end-user's point of view, DataLink provides a consistent way of connecting to a real-time source. DataLink::Kernel and DataLink::Adapters provide all UI for setting up the Real-time connection and data mappings.

Testability

DataLink will provide a TestAdapter for RT applications to use for testing while in the RT application is in development and transition. Data for the TestAdapter can be recorded to a file using the DataLink::Recorder application. In addition, using the RT Recorder and the TestAdapter, DataLink can be used to validate during its development and transition phases.

Scalability-Adaptability

Beyond its goal of providing adapters for multiple real-time sources without having to redeploy the RT application itself, DataLink was architected so that it could be incorporated into a variety of applications. It should be possible to incorporate it into a single application like Perform ToolKit 2 or Petrel; as a service for continuous loading of data form a RT Source; as part of a web service (whose setup is done on the web server itself, not on a web page); or to a database loading application for a system like Drilling Office. Multiple instance of DataLink can run within the same process to allow multiple connections to real-time sources.

The above description of the 'Middleware' being thus described, it will be obvious that the same may be varied in many ways. Such variations are not to be regarded as a departure from the spirit and scope of the claimed method or apparatus or program storage device, and all such modifications as would be obvious to one skilled in the art are intended to be included within the scope of the following claims.

We claim:

1. A program storage device readable by a machine tangibly embodying a program of instructions executable by the machine to perform method steps for linking multiple data sources to multiple applications, the method steps comprising:

receiving a description of data requested by a requesting application of said multiple applications;

passing said description to said multiple data sources, the multiple data sources generating real time data with different formats;

receiving a list of available real time data indicated by the description from one or more of said multiple data sources;

each data source adapting the respective list of available real time data into a format compatible with a single user interface;

receiving user input from the single user interface selecting subsets of the real time data from the lists, the user input creating a mapping between the selected subsets of the real time data and the description from the requesting application, the mapping identifying mapped available real time data consisting of items of the available real time data selected by the user to be utilized by one or more of the multiple applications;

changing through an adapter, of a set of multiple adapters, at least one of a first data format and a first communication protocol associated with said set of mapped available real time data to a second data format and a second communication protocol that is acceptable to the requesting application of said multiple applications and passing said mapped available real time data back to said requesting application.

2. The program storage device of claim 1, further comprising instructions for:

storing the mapping; and retrieving the mapping for subsequently retrieving and adapting data requested by the requesting application from the multiple data sources.

3. An apparatus adapted for linking multiple data sources to multiple applications, comprising:

a processor;

a memory;

a middleware apparatus interconnected between said multiple data sources and said multiple applications, the middleware apparatus including: apparatus for:

receiving a data description from one of said multiple applications, passing said data description to said multiple data sources, and receiving an indication of all available real time data from one or more of said multiple data sources, apparatus for generating in response to receiving the indication a list of all available real time data pertaining to said data description, the list having a data format and a communication protocol compatible with a single user interface utilized by a user for all of the multiple applications and for obtaining data from any of the multiple data sources without regard for data formats and communication protocols associated with the received data, apparatus for receiving user input from the single user interface for mapping at least a subset of said available real time data to said data description thereby identifying a set of mapped available real time data consisting of items of the available real time data selected by the user to be utilized by one or more of the multiple applications, said set of mapped available real time data having said data format and said communication protocol;

an adapter for changing at least one of said data format and said communication protocol of each subset of the available real time data to a resultant data format and a resultant communication protocol that is acceptable to said one of said multiple applications, and apparatus for passing said subsets of the available real time data to said one of said multiple applications.

4. The apparatus of claim 3, wherein said middleware apparatus further comprises:

apparatus adapted for changing, by a second one of said one or more adapters, at least one of the first data format and the first communication protocol associated with said set of mapped available real time data to a third data format and a third communication protocol that is acceptable to a second one of said multiple applications.

5. A method of linking multiple data sources to multiple applications, comprising:

receiving a data description of requested data from a requesting application and passing said data description to said multiple data sources;

receiving from one of said multiple data sources a list of available real time data indicated by the data description, said list of available real time data having a data format and a communication protocol compatible with a single user interface utilized by a user for all of the multiple applications and for obtaining data from any of the multiple data sources without regard for data formats and communication protocols associated with the received data;

receiving user input from the single user interface selecting subsets of the available real time data from the list, the user input creating a mapping between the selected subsets of the available real time data and the data description from the application;

generating the selected subsets of available real time data selected by the user input;

changing at least one of a data format and a communication protocol of the selected subsets of the available real time data to a new data format and a new communication protocol compatible with the requesting application; and passing said selected subsets of the available real time data back to said requesting application.

6. A program storage device readable by a machine tangibly embodying a program of instructions executable by the machine to perform method steps for linking multiple data sources to multiple applications, the method steps comprising:

receiving at least one data description from an application;

passing said data description to the multiple data sources, each data source generating real time data with a different format;

receiving, from each of the multiple data sources, a list set of all available real time data indicated by the data description;

adapting the lists of all available real time data into a format compatible with a single user interface;

receiving user input from the single user interface, the user input mapping subsets of the real time data from the lists to the data description thereby identifying a set of mapped available real time data;

generating the set of mapped available real time data from at least one of the multiple data sources said set of mapped available real time data having a data format and a communication protocol compatible with the single user interface utilized by the user for all of the multiple applications and for obtaining data from any of the multiple data sources without regard for data formats and communication protocol associated with the received data;

converting at least one of the data format and the communication protocol of the mapped available real time data to a new data format and a new communication protocol that is acceptable to the application thereby generating modified mapped available real time data; and passing the modified mapped available real time data back to the application.

* * * * *